(12) United States Patent
Mihan et al.

(10) Patent No.: US 8,501,884 B2
(45) Date of Patent: Aug. 6, 2013

(54) POLYETHYLENE AND CATALYST COMPOSITION AND PROCESS FOR THE PREPARATION THEREOF

(75) Inventors: Shahram Mihan, Bad Soden (DE); Harald Schmitz, Weinheim (DE)

(73) Assignee: Basell Polyolefine GmbH, Wessling (DE)

( * ) Notice: Subject to any disclaimer, the term of this patent is extended or adjusted under 35 U.S.C. 154(b) by 3 days.

(21) Appl. No.: 12/450,083

(22) PCT Filed: Mar. 31, 2008

(86) PCT No.: PCT/EP2008/002524
§ 371 (c)(1),
(2), (4) Date: Sep. 10, 2009

(87) PCT Pub. No.: WO2008/125208
PCT Pub. Date: Oct. 23, 2008

(65) Prior Publication Data
US 2010/0093956 A1    Apr. 15, 2010

(30) Foreign Application Priority Data
Apr. 13, 2007    (DE) .................. 10 2007 017 903

(51) Int. Cl.
C08F 4/50           (2006.01)
(52) U.S. Cl.
USPC ...................................................... 526/124.3
(58) Field of Classification Search
USPC ...................................................... 526/124.3
See application file for complete search history.

(56) References Cited

U.S. PATENT DOCUMENTS

| | | |
|---|---|---|
| 3,051,690 A | 8/1962 | Vandenburg et al. |
| 3,125,547 A | 3/1964 | Blatz |
| 3,242,150 A | 3/1966 | Scoggin |
| 3,248,179 A | 4/1966 | Norwood |
| 4,399,054 A | 8/1983 | Ferraris et al. |
| 4,438,238 A | 3/1984 | Fukushima et al. |
| 4,461,873 A | 7/1984 | Bailey et al. |
| 5,153,157 A | 10/1992 | Hlatky |
| 5,306,775 A | 4/1994 | Martin et al. |
| 5,319,029 A | 6/1994 | Martin et al. |
| 5,324,800 A | 6/1994 | Welborn, Jr. |
| 5,350,807 A | 9/1994 | Pettijohn |
| 5,372,980 A | 12/1994 | Davis et al. |
| 5,380,803 A | 1/1995 | Coutant et al. |
| 5,382,630 A | 1/1995 | Stehling et al. |
| 5,530,065 A | 6/1996 | Farley et al. |
| 5,539,076 A | 7/1996 | Nowlin et al. |
| 5,565,534 A | 10/1996 | Aulbach |
| 5,580,939 A | 12/1996 | Ewen et al. |
| 5,585,317 A | 12/1996 | Sacchetti et al. |
| 5,633,394 A | 5/1997 | Welborn |
| 5,698,487 A | 12/1997 | Sacchetti et al. |
| 5,698,642 A | 12/1997 | Govoni et al. |
| 5,703,187 A | 12/1997 | Timmers et al. |
| 5,707,751 A | 1/1998 | Garza et al. |
| 5,710,297 A | 1/1998 | Weller et al. |
| 5,770,753 A | 6/1998 | Kuber et al. |
| 5,786,432 A | 7/1998 | Kuber et al. |
| 5,840,644 A | 11/1998 | Kuber et al. |
| 5,840,948 A | 11/1998 | Rohrmann et al. |
| 5,852,142 A | 12/1998 | Rohrmann et al. |
| 5,852,145 A | 12/1998 | McLain |
| 5,882,750 A | 3/1999 | Mink et al. |
| 5,908,679 A | 6/1999 | Berthold et al. |
| 5,929,264 A | 7/1999 | Rohrmann et al. |
| 5,942,367 A | 8/1999 | Watanabe et al. |
| 5,955,555 A | 9/1999 | Bennett |
| 5,990,254 A | 11/1999 | Weller et al. |
| 6,002,034 A | 12/1999 | McLain et al. |
| 6,013,819 A | 1/2000 | Stevens |
| 6,051,522 A | 4/2000 | Rohrmann et al. |
| 6,051,727 A | 4/2000 | Kuber et al. |
| 6,087,291 A | 7/2000 | Speca et al. |
| 6,160,145 A | 12/2000 | Wu |
| 6,194,341 B1 | 2/2001 | Canich et al. |
| 6,218,472 B1 | 4/2001 | Debras et al. |
| 6,242,544 B1 | 6/2001 | Kuber et al. |
| 6,255,418 B1 | 7/2001 | Jolly et al. |
| 6,255,506 B1 | 7/2001 | Kuber et al. |
| 6,365,779 B2 | 4/2002 | Devore et al. |

(Continued)

FOREIGN PATENT DOCUMENTS

| | | |
|---|---|---|
| CA | 2262493 | 9/1998 |
| CN | 1498904 | 5/2004 |

(Continued)

OTHER PUBLICATIONS

Starzewski et al., "Linear and Branched Polyethylenes by New Coordination Catalysts," *Transition Metals and Organometallics as Catalysts for Olefin Polymerization*. Laminsky, W.; Sinn, H. (edited); Springer-Verlag Heidelberg; 1988, pp. 349-360.

Hungenberg et al., "Gas Phase Polymerization of α-Olefins with Ziegler-Natta and Metallocene Catalysts: A comparison," BASF AG, Plastics Laboratory, D-67056 Ludwigshafen, Springer-Verlag Heidelberg; 1995.

Small et al., "Highly Active Iron and Cobalt Catalysts for the Polymerization of Ethylene," *Journal of American Chemistry Society*, 120, (1998), 4049-4050.

Britovsek et al., "Novel Olefin Polymerization catalysts Based on Iron and Cobalt," *Chem Commun.*, (1998), 849-850.

Böhm et al., "High-Density Polyethylene Pipe Resins," *Adv. Matter,* 4, (1992), 234-238.

Beach et al., "Dual Functional Catalysis for Ethylene Polymerizatino to Branched Polyethylene. I. Evaluation of Catalytic Systems," *Journal of Polymer Science: Polymer Chemistry Edition*, vol. 22, (1984), 3027-3042.

(Continued)

*Primary Examiner* — Yong Chu
*Assistant Examiner* — Sonya Wright

(57) ABSTRACT

The invention relates to a bimodal or multimodal polyethylene which comprises ethylene homopolymers and/or copolymers of ethylene with α-olefins, has a polydispersity index Mw/Mn of the low molecular weight component of less than 10 and can be prepared using a polymerization catalyst based on a Ziegler component and a late transition metal component having a tridentate ligand which bears at least two ortho, ortho-disubstituted aryl radicals and also a catalyst system and a process for preparing the polyethylene and also fibers, moldings, films and polymer blends comprising this material.

6 Claims, No Drawings

(56) References Cited

U.S. PATENT DOCUMENTS

| | | |
|---|---|---|
| 6,407,192 B1 | 6/2002 | Debras et al. |
| 6,410,664 B1 | 6/2002 | Bansleben et al. |
| 6,413,477 B1 | 7/2002 | Govoni et al. |
| 6,417,302 B1 | 7/2002 | Bohnen |
| 6,417,364 B1 | 7/2002 | Lenges |
| 6,423,848 B2 | 7/2002 | Bennett |
| 6,432,862 B1 | 8/2002 | Bennett |
| 6,433,111 B1 | 8/2002 | Kristen et al. |
| 6,437,161 B1 | 8/2002 | Mihan et al. |
| 6,444,606 B1 | 9/2002 | Bingel et al. |
| 6,444,906 B1 | 9/2002 | Heberkemp et al. |
| 6,451,939 B1 | 9/2002 | Britovsek et al. |
| 6,455,642 B1 | 9/2002 | Myhre et al. |
| 6,455,660 B1 | 9/2002 | Clutton et al. |
| 6,462,155 B1 | 10/2002 | Okuda et al. |
| 6,465,386 B1 | 10/2002 | Maddox et al. |
| 6,548,442 B1 | 4/2003 | McDaniel |
| 6,589,905 B1 | 7/2003 | Fischer et al. |
| 6,620,953 B1 | 9/2003 | Bingel et al. |
| 6,645,901 B2 | 11/2003 | Goto et al. |
| 6,657,026 B1 | 12/2003 | Kimberley et al. |
| 6,683,141 B1 | 1/2004 | Gibson et al. |
| 6,683,187 B2 | 1/2004 | De Boer |
| 6,699,948 B2 | 3/2004 | Mihan et al. |
| 6,756,505 B1 | 6/2004 | Kristen et al. |
| 6,787,498 B2 | 9/2004 | Mihan et al. |
| 6,812,182 B2 | 11/2004 | Wu |
| 6,812,185 B2 | 11/2004 | Fischer et al. |
| 6,838,563 B2 | 1/2005 | Mihan |
| 6,878,785 B2 | 4/2005 | McDaniel |
| 6,884,857 B1 | 4/2005 | Stevens |
| 6,900,153 B2 | 5/2005 | Presichuber-Pfuegl et al. |
| 6,919,412 B1 | 7/2005 | Mihan et al. |
| 7,038,070 B2 | 5/2006 | Bingel |
| 7,045,644 B2 | 5/2006 | Schopf et al. |
| 7,053,160 B1 | 5/2006 | Bingel |
| 7,163,907 B1 | 1/2007 | Canich |
| 7,534,847 B2 | 5/2009 | Mihan et al. |
| 7,666,959 B2 | 2/2010 | Razavi |
| 7,671,148 B2 | 3/2010 | Mihan |
| 7,723,448 B2 | 5/2010 | Mihan et al. |
| 7,767,613 B2 | 8/2010 | Mihan |
| 7,795,411 B2 | 9/2010 | Scholler |
| 7,834,112 B2 | 11/2010 | Mihan et al. |
| 7,928,051 B2 | 4/2011 | Kipke et al. |
| 8,008,403 B2 | 8/2011 | Kipke et al. |
| 8,222,356 B2 | 7/2012 | Kipke et al. |
| 8,227,557 B2 | 7/2012 | Mihan et al. |
| 8,252,875 B2 | 8/2012 | Mihan et al. |
| 2001/0000519 A1 | 4/2001 | Bennett |
| 2002/0026012 A1 | 2/2002 | Mecking |
| 2002/0058584 A1 | 5/2002 | Bennett et al. |
| 2002/0061264 A1 | 5/2002 | Govoni et al. |
| 2002/0072578 A1 | 6/2002 | Wu et al. |
| 2002/0128403 A1 | 9/2002 | Stevens et al. |
| 2003/0036658 A1 | 2/2003 | Mihan et al. |
| 2003/0036662 A1 | 2/2003 | Mihan et al. |
| 2003/0055267 A1 | 3/2003 | Mihan et al. |
| 2003/0125195 A1 | 7/2003 | Britovsek et al. |
| 2003/0171511 A1 | 9/2003 | McDaniel et al. |
| 2003/0225225 A1 | 12/2003 | Shih |
| 2004/0054088 A1 | 3/2004 | Kazakov et al. |
| 2005/0159300 A1 | 7/2005 | Jensen |
| 2005/0192822 A1 | 9/2005 | Hartenstein et al. |
| 2007/0043177 A1 | 2/2007 | Michie et al. |
| 2007/0066772 A1 | 3/2007 | Foettinger et al. |
| 2007/0155919 A1 | 7/2007 | Okumura et al. |
| 2007/0173400 A1 | 7/2007 | Severn et al. |
| 2007/0213205 A1 | 9/2007 | Mihan et al. |
| 2007/0255033 A1 | 11/2007 | Kipke et al. |
| 2007/0282110 A1 | 12/2007 | Kolling |
| 2008/0139750 A1 | 6/2008 | Berthold et al. |
| 2008/0166535 A1 | 7/2008 | Berthold et al. |
| 2008/0199674 A1 | 8/2008 | Berthold et al. |
| 2009/0054609 A1 | 2/2009 | Mihan et al. |
| 2009/0105428 A1 | 4/2009 | Mihan |
| 2009/0306299 A1 | 12/2009 | Kipke et al. |
| 2009/0306324 A1 | 12/2009 | Kipke et al. |
| 2010/0087607 A1 | 4/2010 | Mihan et al. |
| 2010/0093956 A1 | 4/2010 | Mihan et al. |
| 2010/0234548 A1 | 9/2010 | Kolling et al. |
| 2010/0267910 A1 | 10/2010 | Kolling et al. |
| 2010/0311925 A1 | 12/2010 | Mihan et al. |
| 2011/0281722 A1 | 11/2011 | Kipke et al. |
| 2011/0294969 A1 | 12/2011 | Schmitz et al. |

FOREIGN PATENT DOCUMENTS

| | | |
|---|---|---|
| CN | 1850339 | 10/2006 |
| EP | 0100843 | 2/1984 |
| EP | 129368 | 12/1984 |
| EP | 0129368 | 12/1984 |
| EP | 350339 | 1/1990 |
| EP | 0416815 | 3/1991 |
| EP | 0420436 | 4/1991 |
| EP | 0 533 154 | 9/1992 |
| EP | 0533155 | 3/1993 |
| EP | 0533156 | 3/1993 |
| EP | 0533160 | 3/1993 |
| EP | 0545304 | 6/1993 |
| EP | 0561479 | 9/1993 |
| EP | 0576970 | 1/1994 |
| EP | 0632063 | 1/1995 |
| EP | 0659758 | 6/1995 |
| EP | 0661300 | 7/1995 |
| EP | 662989 | 7/1995 |
| EP | 728160 | 8/1996 |
| EP | 739937 | 10/1996 |
| EP | 1041089 | 10/2000 |
| EP | 1212333 | 6/2002 |
| EP | 1300423 | 4/2003 |
| EP | 1428854 | 6/2004 |
| EP | 1568716 | 8/2005 |
| WO | WO-9003414 | 4/1990 |
| WO | WO 91/09882 | 7/1991 |
| WO | WO-9303093 | 2/1993 |
| WO | WO-95/11264 | 4/1995 |
| WO | WO-9512622 | 5/1995 |
| WO | WO 95/27005 | 10/1995 |
| WO | WO-96/00243 | 1/1996 |
| WO | WO-9600243 | 1/1996 |
| WO | WO-97/04015 | 2/1997 |
| WO | WO-9728170 | 8/1997 |
| WO | WO-97/36937 | 10/1997 |
| WO | WO-9803559 | 1/1998 |
| WO | WO-9822486 | 5/1998 |
| WO | WO-98/27124 | 9/1998 |
| WO | WO-98/40419 | 9/1998 |
| WO | WO-9840419 | 9/1998 |
| WO | WO-99/06414 | 2/1999 |
| WO | WO-9906414 | 2/1999 |
| WO | WO-99/12981 | 3/1999 |
| WO | WO-99/46302 | 9/1999 |
| WO | WO-9946302 | 9/1999 |
| WO | WO-99/50318 | 10/1999 |
| WO | WO-00/05277 | 2/2000 |
| WO | WO-0005277 | 2/2000 |
| WO | WO-00/24787 | 5/2000 |
| WO | WO-00/31090 | 6/2000 |
| WO | WO-0031090 | 6/2000 |
| WO | WO-0035928 | 6/2000 |
| WO | WO-0055216 | 9/2000 |
| WO | WO-00/58320 | 10/2000 |
| WO | WO-00/68279 | 11/2000 |
| WO | WO-0109148 | 2/2001 |
| WO | WO-01/25328 | 4/2001 |
| WO | WO-0123443 | 4/2001 |
| WO | WO-0136496 | 5/2001 |
| WO | WO-01/41920 | 6/2001 |
| WO | WO-01/58874 | 8/2001 |
| WO | WO-02/28805 | 4/2002 |
| WO | WO-0246249 | 6/2002 |
| WO | WO-02088200 | 11/2002 |
| WO | WO-03040201 | 5/2003 |
| WO | WO-03/099882 | 12/2003 |

| | | |
|---|---|---|
| WO | WO-2004018489 | 3/2004 |
| WO | WO-2004/037415 | 5/2004 |
| WO | WO-2004067586 | 8/2004 |
| WO | WO-2004/074333 | 9/2004 |
| WO | WO-2005/090371 | 9/2005 |
| WO | WO-2005103096 | 11/2005 |
| WO | WO-2005103100 | 11/2005 |
| WO | WO-2006045737 | 5/2006 |
| WO | WO-2006114210 | 11/2006 |
| WO | WO-2009/043156 | 4/2009 |

OTHER PUBLICATIONS

Randall, "A Review of High Resolution Liquid $^{13}$Carbon Nuclear Magnetic Resonance Characterizations of Ethylene-Based Polymers," JMS-REV Macromol. Chem. Phys., C29 (2&3), 201-317, (1989).

Chen et al., "Halogen-Substituted 2,6-Bis(imino)pyridyl Iron and Cobalt Complexes: Highly Active Catalysts for Polymerizatino and Oligomerization of Ethylene," *Organometallics,* 22, (2003) 4312-4321.

Chen, Y. et al., "Halogen-Substituted 2,6-Bis(imino)pyridyl Iron and Cobalt Complexes: Highly Active Catalysts for Polymerization and Oligomerization of Ethylene", Organometallics vol. 22(21) 2003, 4312-4321.

Small, Brooke L. et al., "Highly Active Iron and Cobalt Catalysts for the Polymerization of Ethylene", J.Am. Chem. Soc. 1998. 4049-4050.

Britovsek, G. et al., "Novel Olefin Polymerization Catalysts based on Iron and Cobalt", Chem. Commun. 1998. 849-850.

Strauss, Steven H., "The Search for Larger and More Weakly Coordinating Anions", Chem. Rev. vol. 93(3) 1993, 927-942.

Bohm, Ludwig L. et al., "High-Density Polyethylene Pipe Resins", Advanced Materials 4 No. 3 1992, 234-238.

Randall, J., "A Review of High Resolution Liquid (13) Carbon Nuclear Magnetic Resonance Characterizations of Ethylene-Based Polymers", JMS-Rev. Macromol. Chem. Phys. C29 (2&3) 1989, 201-317.

Wiesenfeldt, Helga, "ansa-Metallocene derivatives; XVII. Racemic and meso diastereomers of group IV metallocene derivatives with symmetrically substituted dimethylsilanediyl-bridged ligand frameworks. Crystal structure of R,S-Me2SI(3-1-Bu-5-MeC5H2)2ZrCl2", Journal of Organometallic Chemistry, 369 Elsevier Sequoia S.A., Lausanne—Printed in the Netherlands 1989, 359-370.

Starzweski, K. O. et al., "Linear and Branched Polyethylenes by new Coordination Catalysts", Transition Metals and Organometallics as Catalysts for Olefin Polymerization Springer-Verlag Berlin Heidelberg 1988, 349-360.

Beach, D. et al., "Dual Functional Catalysis for Ethylene Polymerization to Branched Polyethylene. I Evaluation of Catalytic Systems", Journal of Polymer Science: Polymer Chemistry Edition vol. 22 1984, 3027-3042.

Hermann, C. et al., "Beeinflussung von titanhaltigen Polymerisations-katalysatoren durch zusatzliche Metalle", Die Angewandte Makromolekulare Chemie 94 1981, 91-104.

Holtrup, Wolfgang, "Zur Fraktionierung von Polymeren durch Direktextraktion", Makromol. Chem. 178 1997, 2335-2349.

Burkhardt, U., "Preparation of Polymers Having New Properties", Conference Baden-Baden Nov. 29-30, 1995/VDI-Gesellschaft Kunststofftechnik (Plastics Technology) Dusseldorf: VDI-VERl., 1995, IDBN 3-18-234191-X Aufbereiten von Polymeren mit neuartigen Eigenschaften Nov. 29, 1995, 3 pages.

Scott, et al., "Metal versus Ligand Alkylation in the Reactivity of the (Bis-iminopyridinate)Fe Catalyst", Journal of American Chemical Society 127 2005, 13019-13029.

Li, Wugi Huaxue Xuebao et al., "Chinese Journal of Inorganic Chemistry", 20 (4) 2004, 483-487.

Chen, Yaofeng et al., "Halogen-Substituted 2,6-Bis(imino)pyridyl Iron and Cobalt Complexes: Highly Active Catalysts for Polymerization and Oligomerization of Ethylene", Organometallics, 2003, 22 2003, 4312-4321.

Musikabhumma, Kittichote et al., "Synthesis of Branched Polyethylenes by the Tandem Catalysis of Silica-Supported Linked Cyclopentadienyl-Amido Titanium Catalysts and a Homogeneous Dibromo Nickel Catalyst Having a Pyridylimine Ligand", Journal of Polymer Science, vol. 41, 2003, 528-544.

Michl (Editor), et al., Chemical Reviews vo. 100 (4-6) 2000, 1167-2476.

Ittel, Steven D. et al., "Late-Metal Catalysts for Ethylene Homo-and Copolymerization", 2000, 1169-1203.

Ewen, J. et al., "Expanding the Scope of Metallocene Catalysis: Beyond Indenyl and Fluorenyl Derivatives", 1999, 150-169.

Britovsek, et al., "The Search for New-Generation Olefin Polymerization Catalysts: Life beyond Metallocenes", Angew Chem. Int. Ed. 38 1999, 428-447.

Enders, M. et al., "8-Quinolylcyclopentadienyl, a Ligand with a Tailored Fit for Chelate Complexes", Chem. Ber. 129 1996, 459-463.

Jutzi, P. et al., J. Organomet. Chem 500 1995, 175-185.

Halterrman, R., "Synthesis and Applications of Chiral Cyclopentadienylometal Complexes", Chem. Rev. vol. 92(5) 1992, 965-994.

Wild, L, "Temperature rising elution fractionation", Adv. Polymer Sci. 98 1990, 1-47.

Lettau, "Chemie der Heterocyclen", 1st edition, VEB Weinheim 1979, 17-27.

Tohi, et al., "Polyethylenes with Uni-, Bi-and Trimodal Molecular Weight Distributions Produced with a Single Bis (phenoxyimine)zirconium Complex", Macromolecules vol. 36, No. 3 Feb. 11, 2003, 523-525.

POLYETHYLENE AND CATALYST COMPOSITION AND PROCESS FOR THE PREPARATION THEREOF

CROSS-REFERENCE TO RELATED APPLICATIONS

This application is a national phase filing under 35 U.S.C. §371 of International Application PCT/EP2008/002524, filed 31 Mar. 2008, claiming priority to German Patent Application 10 2007 017 903.2 filed 13 Apr. 2007; the disclosures of International Application PCT/EP2008/002524 and German Patent Application 10 2007 017 903.2, each as filed, are incorporated herein by reference.

DESCRIPTION

The present invention relates to a novel polyethylene, a catalyst composition and a process for the preparation thereof, and also fibers, moldings, films or polymer blends comprising this polyethylene.

The mechanical strength of moldings comprising polyethylene has to meet ever more exacting requirements. In particular, there is a demand for stiff products which are resistant to stress cracking, have a high impact toughness and are particularly suitable for producing hollow bodies and pressure pipes. The requirement of simultaneously good environmental stress cracking resistance and stiffness is not easy to meet since these properties run counter to one another. While the stiffness increases with increasing density of the polyethylene, the stress cracking resistance decreases with increasing density.

Stress crack formation in polymers is a physical process which does not change the polymer molecules. It is caused, inter alia, by gradual yielding or untangling of the connecting molecule chains. Stress crack formation occurs less easily the higher the mean molecular weight, the broader the molecular weight distribution and the higher the molecular degree of branching, i.e. the lower the densities. Surface-active substances, in particular soaps, and thermal stress have an accelerating effect on stress crack formation.

The properties of bimodal polyethylenes depend, firstly, on the properties of the components comprised therein. Secondly, how well the high molecular weight component and the low molecular weight component are mixed with one another is of importance, particularly for the mechanical properties of the polyethylene. Poor mixing causes, inter alia, a low environmental stress cracking resistance and impairs the long-term performance of pressure pipes comprising polyethylene blends.

It has been found to be advantageous to use blends of a high molecular weight, low density ethylene copolymer and a low molecular weight, high density ethylene homopolymer which have good environmental stress cracking resistances as described, for example, in L. L. Böhm et al., Adv. Mater. 4, 234-238 (1992) for hollow bodies and pressure pipes. Similar polyethylene blends are disclosed in EP-A 100 843, EP-A 533 154, EP-A 533 155, EP-A 533 156, EP-A 533 160 and U.S. Pat. No. 5,350,807.

Such bimodal polyethylene blends are often produced using reactor cascades, i.e. two or more polymerization reactors are connected in series, with the polymerization of the low molecular weight component occurring in the first reactor and that of the high molecular weight component occurring in the next reactor (see, for example, M. Rätzsch, W. Neiβl "Bimodale Polymerwerkstoffe auf der Basis von PP and PE" in "Aufbereiten von Polymeren mit neuartigen Eigenschaften" pp. 3-25, VDI-Verlag, Düsseldorf 1995). This process has the disadvantage that large amounts of hydrogen have to be added to produce the low molecular weight component. The polymers obtained in this way therefore have a low content of vinyl end groups, in particular in the low molecular weight component. To prevent comonomers added in a reactor or hydrogen added as regulator from getting into the next reactor, a high outlay in terms of apparatus is also necessary.

The use of catalyst compositions comprising two or more different olefin polymerization catalysts of the Ziegler type or of the metallocene type is known. For example, the combination of two catalysts of which one produces a polyethylene having a different mean molar mass from the other can be used for preparing reactor blends having broad molecular weight distributions (WO 95/11264). The copolymers of ethylene with higher α-olefins such as propene, 1-butene, 1-pentene, 1-hexene or 1-octene, known as LLDPE (linear low density polyethylene), which are formed using classical Ziegler-Natta catalysts based on titanium therefore differ from an LLDPE which is prepared using a metallocene. The number of side chains formed by incorporation of the comonomer and their distribution, known as the short chain branching distribution (SCBD), is very different when using the various catalyst systems. The number and distribution of the side chains has a critical influence on the crystallization behavior of the ethylene copolymers. While the flow properties and thus the processing of these ethylene copolymers depend mainly on their molar mass and molar mass distribution, the mechanical properties are dependent on, in particular, the short chain branching distribution. The short chain branching distribution also plays a role in particular processing operations, e.g. in film extrusion in which the crystallization behavior of the ethylene copolymers during cooling of the extruded film is an important factor, i.e. it determines the speed at which a film can be extruded and its quality. Finding the correct combination of catalysts for a balanced combination of good mechanical properties and good processability is difficult in view of the large number of possible combinations.

The addition of metal components, including late transition metals, to olefin polymerization catalysts based on early transition metals in order to increase the activity or stability of the latter catalysts has been widely described (Herrmann, C.; Streck, R.; Angew. Makromol. Chem. 94 (1981) 91-104).

The synthesis of branched ethylene polymers without use of a comonomer by means of bimetallic catalysts in which one catalyst oligomerizes part of the ethylene and the other copolymerizes the resulting oligomers with ethylene has been described (Beach, David L., Kissin, Yury V., J. Polym. Sci., Polym. Chem. Ed. (1984), 22, 3027-42. Ostoja-Starzewski, K. A., Witte, J., Reichert, K. H., Vasiliou, G. in Transition Metals and Organometallics as Catalysts for Olefin Polymerization. Kaminsky, W.; Sinn, H. (edited); Springer-Verlag; Heidelberg; 1988; pp. 349-360). The latter reference describes, for example, the use of a nickel-comprising oligomerization catalyst in combination with a chromium-comprising polymerization catalyst.

WO 99/46302 describes a catalyst composition based on (a) an iron-pyridinebisimine component and (b) a further catalyst such as a zirconocene or Ziegler catalyst and its use for the polymerization of ethylene and olefins.

The known ethylene copolymer blends still leave something to be desired in respect of the combination of good mechanical properties and good processability in order to be suitable, for example, for applications such as crosslinked pipes.

It was an object of the present invention to provide a suitable polyethylene having good mechanical properties and good processability and a high proportion of vinyl groups.

It has surprisingly been found that this object can be achieved by a specific catalyst composition by means of which a polyethylene having good mechanical properties and good processability and a high proportion of vinyl groups can be prepared.

We have accordingly found a bimodal or multimodal polyethylene which comprises ethylene homopolymers or copolymers of ethylene with α-olefins, has a polydispersity in the low molecular weight fraction Mw/Mn of less than 10, in particular less than 8, and can be prepared using a polymerization catalyst based on a Ziegler component and a late transition metal component having a tridentate ligand which bears at least two ortho,ortho-disubstituted aryl radicals. The ortho,ortho-disubstituted aryl radicals are preferably substituted in each case by at least one halogen in the α position.

Furthermore, polymer blends in which at least one polyethylene according to the invention is comprised have been found.

In addition, the use of the polyethylenes of the invention for producing fibers, films and moldings has been found.

Furthermore, we have found a catalyst system for preparing the polyethylenes of the invention, the use of the catalyst system for the polymerization of ethylene or copolymerization of ethylene with olefins and a process for preparing the polyethylene of the invention by polymerization of ethylene or copolymerization of ethylene with olefins in the presence of the catalyst system.

The polyethylene of the invention has a polydispersity of the low molecular weight component Mw/Mn of less than 10, preferably less than 8. The polydispersity of the total polymer is in the range from 4 to 100 and preferably from 6 to 50. The density of the polyethylene of the invention is in the range from 0.89 to 0.98 g/cm$^3$ and preferably from 0.93 to 0.97 g/cm$^3$. The weight average molar mass Mw of the polyethylene of the invention is in the range from 80 000 g/mol to 80 0000 g/mol, preferably from 100 000 g/mol to 700 000 g/mol and particularly preferably in the range from 150 000 to 600 000 g/mol and very particularly preferably in the range from 150 000 to 500000 g/mol. Particularly preferred ranges are from 150 000 to 350 000 g/mol and from 250 000 to 500 000 g/mol.

The molar mass distribution of the polyethylene of the invention can be bimodal or multimodal. For the purposes of the present patent application, a bimodal molar mass distribution means that the molar mass distribution has at least two points of inflection on one flank of a maximum.

The polyethylene of the invention has from 0.01 to 20 branches/1000 carbon atoms, preferably from 1 to 15 branches/1000 carbon atoms and particularly preferably from 3 to 10 branches/1000 carbon atoms. The branches/1000 carbon atoms are determined by means of $^{13}$C-NMR, as described by James C. Randall, JMS-REV. Macromol. Chem. Phys., C29 (2&3), 201-317 (1989) and relate to the total CH$_3$ group content/1000 carbon atoms.

The polyethylene of the invention has at least 0.1 vinyl group/1000 carbon atoms, preferably from 0.7 to 5 vinyl groups/1000 carbon atoms and particularly preferably from 0.9 to 3 vinyl groups/1000 carbon atoms. The content of vinyl groups/1000 carbon atoms is determined by means of IR, ASTM D 6248-98. For the present purposes, the expression vinyl groups refers to —CH=CH$_2$ groups. Vinylidene groups and internal olefin groups are not comprised by this expression. Vinyl groups are usually attributed to a polymer termination reaction after an ethylene insertion, while vinylidene end groups are usually formed by a polymer termination reaction after a comonomer insertion. Vinylidene and vinyl groups can be functionalized or crosslinked afterward, with vinyl groups usually being more suitable for these subsequent reactions. The polyethylene of the invention is therefore particularly suitable for applications which require subsequent functionalization or crosslinking, for example pipes, or for producing adhesives. Preference is given to at least 0.2 vinyl group/1000 carbon atoms, preferably from 0.5 to 10 vinyl groups/1000 carbon atoms and particularly preferably from 0.7 to 5 vinyl groups/1000 carbon atoms, being comprised in the 20% by weight of the polyethylene having the lowest molar masses. Xylene and ethylene glycol diethyl ether at 130° C. are used as solvent for the fractionation. This can be determined by Holtrup fractionation as described in W. Holtrup, Makromol. Chem. 178, 2335 (1977) coupled with a measurement of the various fractions by means of IR. 5 g of polyethylene were used and divided into 8 fractions.

The polyethylene of the invention preferably has at least 0.05 vinylidene group/1000 carbon atoms, in particular from 0.1 to 1 vinylidene group/1000 carbon atoms and particularly preferably from 0.15 to 0.5 vinylidene group/1000 carbon atoms. The determination is carried out in accordance with ASTM D 6248-98.

The 5-50% by weight of the polyethylene of the invention having the lowest molar masses, preferably 10-40% by weight and particularly preferably 15-30% by weight, have a degree of branching of less than 10 branches/1000 carbon atoms. This degree of branching in the part of the polyethylene having the lowest molar masses is preferably in the range from 0.01 to 5 branches/1000 carbon atoms and particularly preferably in the range from 0.1 to 2 branches/1000 carbon atoms. The 5-50% by weight of the polyethylene of the invention having the highest molar masses, preferably 10-40% by weight and particularly preferably 15-30% by weight, have a degree of branching of more than 2 branches/1000 carbon atoms. This degree of branching in the part of the polyethylene having the highest molar masses is preferably in the range from 2 to 40 branches/1000 carbon atoms and particularly preferably in the range from 5 to 20 branches/1000 carbon atoms. The part of the polyethylene having the lowest or highest molar mass is determined by the method of Holtrup as described in W. Holtrup, Makromol. Chem. 178, 2335 (1977) and the fractions are subsequently examined by $^{13}$C-NMR spectroscopy. Thus, the degree of branching can be determined by means of $^{13}$C-NMR in the various polymer fractions, as described by James C. Randall, JMS-REV. Macromol. Chem. Phys., C29 (2&3), 201-317 (1989). The degree of branching relates to the total CH$_3$ content/1000 carbon atoms in the low or high molecular weight fractions.

The polyethylene of the invention preferably has from 0.01 to 20 branches formed by side chains larger than CH$_3$/1000 carbon atoms, preferably from 1 to 15 branches formed by side chains larger than CH$_3$/1000 carbon atoms and particularly preferably from 2 to 8 branches formed by side chains larger than CH$_3$/1000 carbon atoms. The branches/1000 carbon atoms are determined by means of $^{13}$C-NMR as described by James C. Randall, JMS-REV. Macromol. Chem. Phys., C29 (2&3), 201-317 (1989) and relate to the total CH$_3$ group content/1000 carbon atoms.

In the polyethylene of the invention, the part of the polyethylene having a molar mass of less than 10 000 g/mol, preferably less than 20000 g/mol, preferably has a degree of branching of from 0 to 1.5 branches formed by side chains larger than CH$_3$/1000 carbon atoms. The part of the polyethylene having a molar mass of less than 10 000 g/mol, preferably less than 20 000 g/mol, particularly preferably has a degree of branching of from 0.1 to 0.9 branches formed by side chains larger than $CH_3$/1000 carbon atoms. This too can be determined by means of the above-described Holtrup/$^{13}$C-NMR method.

Preference is also given to at least 70% of the branches formed by side chains which are larger than $CH_3$ to be comprised in the 50% by weight of the polyethylene of the invention having the highest molar masses. This too can be determined by means of the above-described Holtrup/$^{13}$C-NMR method.

The molar mass distribution of the polyethylene of the invention can formally be calculated as an overlap of two or more, preferably two, monomodal molar mass distributions. The maxima of the molar mass of the low molecular weight component are preferably in the range from 3000 to 100 000 g/mol and in particular from 5000 to 50 000 g/mol. The maxima of the molar mass of the high molecular weight component are preferably in the range from 40 000 to 500 000 g/mol and in particular from 50 000 to 200 000 g/mol. The difference between the individual peaks of the molar mass distribution of the polyethylene of the invention is preferably in the range from 30 000 to 400 000 g/mol, particularly preferably from 50 000 to 200 000 g/mol.

The HLMI of the polyethylene of the invention is preferably in the range from 0 to 200 g/10 min, preferably from 5 to 50 g/10 min. For the purposes of the present invention, the expression "HLMI" is, as is known, short for "high load melt index" and is determined at 190° C. under a load of 21.6 kg (190° C./21.6 kg) in accordance with ISO1133.

The polyethylene of the invention preferably has a mixing quality measured in accordance with ISO 13949 of less than 3, in particular from 0 to 2.5. This value relates to the polyethylene taken directly from the reactor, viz. the polyethylene powder, without prior melting in an extruder. This polyethylene powder can preferably be obtained by polymerization in a single reactor.

Possible comonomers which can be comprised in addition to ethylene in the ethylene copolymer part of the polyethylene of the invention, either individually or as a mixture with one another, are all α-olefins having from 3 to 12 carbon atoms, e.g. propene, 1-butene, 1-pentene, 1-hexene, 4-methyl-1-pentene, 1-heptene, 1-octene and 1-decene. The ethylene copolymer preferably comprises α-olefins having from 4 to 9 carbon atoms, e.g. 1-butene, 1-pentene, 1-hexene, 4-methyl-pentene or octene, as comonomer unit. Particular preference is given to using α-olefins selected from the group consisting of 1-butene, 1-hexene and 1-octene.

The ethylene copolymer of the invention can also be a constituent of a polymer blend. Thus, for example, two or three different ethylene copolymers according to the invention which can differ, for example, in density and/or molar mass distribution and/or short chain branching distribution can be mixed with one another.

Further suitable polymer blends comprise (P1) from 20 to 99% by weight of one or more of the polyethylenes of the invention and (P2) from 1 to 80% by weight of a polymer which is different from (P1), where the % by weight is based on the total mass of the polymer blend.

Particularly useful polymer blends are those comprising (E) from 30 to 95% by weight of one of the polyethylenes according to the invention, particularly preferably from 50 to 85% by weight, and (F) from 5 to 70% by weight of a polyolefin which is different from (P1), particularly preferably from 15 to 50% by weight, with the % by weight being based on the total mass of the polymer blend.

The type of further polymer components (P2) in the blend depends on the future use of the blend. Mixing can be carried out, for example, by blending with one or more additional LLDPEs or HDPEs or LDPEs or PPs or polyamides or polyesters. As an alternative, the polymer blend can be obtained by simultaneous polymerization using further catalyst systems which are likewise active for polymerization of olefins. Catalysts which can be used for producing the polymer blends or for the simultaneous polymerization are, in particular, Ziegler catalysts based on titanium, classical Phillips catalysts based on chromium oxides, metallocenes, in particular metal complexes of groups 3 to 6 of the Periodic Table of the Elements comprising one, two or three cyclopentadienyl, indenyl and/or fluorenyl systems, known as constrained geometry complexes (see, for example, EP A 0 416 815 or EP A 0 420 436), nickel- and palladium-bisimine systems (which can be prepared as described in WO 9803559 A1) or iron- and cobalt-pyridinebisimine compounds (which can be prepared as described in WO 9827124 A1). The further polymerization catalysts can likewise be supported, either on the same support or on different supports.

The blends comprising the polyethylenes of the invention can further comprise two or three other olefin polymers or copolymers. These can be, for example, LDPEs (blends thereof are described, for example, in DE-A1-19745047), or polyethylene homopolymers (blends thereof are described, for example, in EP-B-100843) or LLDPEs (as described, for example, in EP-B-728160 or WO-A-90/03414) or LLDPE/LDPE blends (WO 95/27005 or EP-B1-662989).

The ethylene copolymers, polymer blends and reactor blends can further comprise auxiliaries and/or additives known per se, e.g. processing stabilizers, stabilizers against the effects of light and heat, customary additives such as lubricants, antioxidants, antiblocking agents and antistatics and also, if appropriate, dyes. A person skilled in the art will be familiar with the type and amount of these additives.

Furthermore, it has been found that the addition of small amounts of fluoroelastomers or thermoplastic polyesters can further improve the processing properties of the polyethylenes of the invention. Such fluoroelastomers are known per se as processing aids and are commercially available, e.g. under the trade names Viton® and Dynamar® (see also, for example, U.S. Pat. No. 3,125,547). They are preferably added in amounts of from 10 to 1000 ppm, particularly preferably from 20 to 200 ppm, based on the total mass of the polymer blend according to the invention.

The polyethylenes of the invention can also be modified subsequently by grafting, crosslinking, hydrogenation, functionalization or other functionalization reactions known to those skilled in the art.

The production of the polymer blends by mixing can be carried out by all known methods. This can be effected, for example, by feeding the pulverulent components into a pelletization apparatus, e.g. a twin-screw kneader (ZSK), Farrel kneader or Kobe kneader. Furthermore, a mixture of pellets can also be processed directly on a film production plant.

The polyethylenes and polymer blends of the invention are highly suitable for, for example, the production of films on blown film and cast film plants at high outputs. The films composed of the polymer blends have very good mechanical properties, high shock resistance and high tear strength combined with very good optical properties, in particular transparency and gloss. They are particularly suitable for the packaging sector, for example heat-sealable films, for heavy duty sacks, but also for the food sector. In addition, the films display only a low tendency to blocking and can therefore be handled on machines without lubricants and antiblocking additives or using only small amounts of these.

Owing to their good mechanical properties, the polyethylenes of the invention are likewise suitable for producing fibers and moldings, in particular for pipes and crosslinkable pipes. They are likewise suitable for blow molding, roto molding or injection molding. They are also suitable as compounding components, bonding agents and as rubber components in polypropylene, in particular in polypropylene compounds having high impact toughnesses.

Fibers, films and moldings in which the polyethylene of the invention is comprised as substantial component are ones which comprise from 50 to 100% by weight, preferably from 60 to 90% by weight, of the polyethylene of the invention, based on the total polymer material utilized for manufacture. In particular, films and moldings in which one of the layers comprises from 50 to 100% by weight of the polyethylene of the invention are also comprised.

Preference is given to fibers comprising a polyethylene according to the invention having a density in the range from 0.94 to 0.96 g/cm$^3$. These fibers preferably have an Ml$_5$ of 0.5-5 g/10 cm. Preference is given to films comprising a polyethylene according to the invention having a density in the range from 0.91 to 0.95 g/cm$^3$ and in particular from 0.92 to 0.94 g/cm$^3$. These films preferably have an Ml$_5$ of 0-20 g/10 cm. Preference is given to moldings comprising a polyethylene according to the invention having a density in the range from 0.93 to 0.97 g/cm$^3$. These moldings preferably have an Ml$_5$ of 0-5 g/10 cm. Among these moldings, particular preference is given to pipes, large hollow bodies having a volume of greater than 10 l and bottles. Particular preference is given to pipes comprising a polyethylene according to the invention having a density in the range from 0.93 to 0.955 g/cm$^3$. These pipes preferably have an Ml$_5$ of 0-1 g/10 cm. Particular preference is given to large hollow bodies comprising a polyethylene according to the invention having a density in the range from 0.94 to 0.955 g/cm$^3$. These large hollow bodies preferably have an Ml$_5$ of 0-1 g/10 cm. Particular preference is given to bottles comprising a polyethylene according to the invention having a density in the range from 0.945 to 0.955 g/cm$^3$. These bottles preferably have an Ml$_5$ of 0.5-5 g/10 cm. Preference is also given to injection-molded products comprising a polyethylene according to the invention having a density in the range from 0.95 to 0.97 g/cm$^3$. These products preferably have an Ml$_5$ of 2-60 g/10 cm.

The polyethylene of the invention can be obtained using the catalyst system of the invention and in particular its preferred embodiments.

The present invention further provides a catalyst composition comprising at least two different polymerization catalysts of which A) is at least one Ziegler polymerization catalyst (A) and (B) is at least one polymerization catalyst based on a late transition metal component having a tridentate ligand which bears at least two ortho,ortho-disubstituted aryl radicals (B).

The ortho,ortho-disubstituted aryl radicals are preferably substituted in each case by at least one halogen in the α-position.

The invention further provides a process for the polymerization of ethylene in the presence of the catalyst composition of the invention.

Catalyst components of the Ziegler type are well known and described in the prior art, for example in ZIEGLER CATALYSTS 363-386 (G. Fink, R. Mülhaupt and H. H. Brintzinger, eds., Springer-Verlag 1995).

The catalyst of the Ziegler type preferably comprises a solid component comprising a compound of titanium or vanadium, a compound of magnesium and optionally but preferably a particulate inorganic oxide as support.

As titanium compounds, use is generally made of the halides or alkoxides of trivalent or tetravalent titanium, with titanium alkoxy halogen compounds or mixtures of various titanium compounds also being possible. Examples of suitable titanium compounds are TiBr$_3$, TiBr$_4$, TiCl$_3$, TiCl$_4$, Ti(OCH$_3$)Cl$_3$, Ti(OC$_2$H$_5$)Cl$_3$, Ti(O-i-C$_3$H$_7$)Cl$_3$, Ti(O-n-C$_4$H$_9$)Cl$_3$, Ti(OC$_2$H$_5$)Br$_3$, Ti(O-n-C$_4$H$_9$)Br$_3$, Ti(OCH$_3$)$_2$Cl$_2$, Ti(OC$_2$H$_5$)$_2$Cl$_2$, Ti(O-n-C$_4$H$_9$)$_2$Cl$_2$, Ti(OC$_2$H$_5$)$_2$Br$_2$, Ti(OCH$_3$)$_3$Cl, Ti(OC$_2$H$_5$)$_3$Cl, Ti(O-n-C$_4$H$_9$)$_3$Cl, Ti(OC$_2$H$_5$)$_3$Br, Ti(OCH$_3$)$_4$, Ti(OC$_2$H$_5$)$_4$ or Ti(O-n-C$_4$H$_9$)$_4$. Preference is given to using titanium compounds which comprise chlorine as the halogen. Preference is likewise given to titanium halides which comprise only halogen in addition to titanium and among these especially titanium chlorides and in particular titanium tetrachloride. Among the vanadium compounds, particular mention may be made of the vanadium halides, the vanadium oxyhalides, the vanadium alkoxides and the vanadium acetylacetonates. Preference is given to vanadium compounds in the oxidation states 3 to 5.

In the production of the solid component, at least one compound of magnesium is preferably additionally used. Suitable compounds of this type are halogen-comprising magnesium compounds such as magnesium halides and in particular the chlorides or bromides and magnesium compounds from which the magnesium halides can be obtained in a customary way, e.g. by reaction with halogenating agents. For the present purposes, halogens are chlorine, bromine, iodine or fluorine or mixtures of two or more halogens, with preference being given to chlorine or bromine and in particular chlorine.

Possible halogen-comprising magnesium compounds are in particular magnesium chlorides or magnesium bromides. Magnesium compounds from which the halides can be obtained are, for example, magnesium alkyls, magnesium aryls, magnesium alkoxy compounds or magnesium aryloxy compounds or Grignard compounds. Suitable halogenating agents are, for example, halogens, hydrogen halides, SiCl$_4$ or CCl$_4$ and preferably chlorine or hydrogen chloride.

Examples of suitable, halogen-free compounds of magnesium are diethylmagnesium, di-n-propylmagnesium, diisopropylmagnesium, di-n-butylmagnesium, di-sec-butylmagnesium, di-tert-butylmagnesium, diamylmagnesium, n-butylethylmagnesium, n-butyl-sec-butylmagnesium, n-butyloctylmagnesium, diphenylmagnesium, diethoxymagnesium, di-n-propyloxymagnesium, diisopropyloxymagnesium, di-n-butyloxymagnesium, di-sec-butyloxymagnesium, di-tert-butyloxymagnesium, diamyloxymagnesium, n-butyloxyethoxymagnesium, n-butyloxy-sec-butyloxymagnesium, n-butyloxyoctyloxymagnesium and diphenoxymagnesium. Among these, preference is given to using n-butylethylmagnesium or n-butyloctylmagnesium.

Examples of Grignard compounds are methylmagnesium chloride, ethylmagnesium chloride, ethylmagnesium bromide, ethylmagnesium iodide, n-propylmagnesium chloride, n-propylmagnesium bromide, n-butylmagnesium chloride, n-butylmagnesium bromide, sec-butylmagnesium chloride, sec-butylmagnesium bromide, tert-butylmagnesium chloride, tert-butylmagnesium bromide, hexylmagnesium chloride, octylmagnesium chloride, amylmagnesium chloride, isoamylmagnesium chloride, phenylmagnesium chloride and phenylmagnesium bromide.

As magnesium compounds for producing the particulate solids, preference is given to using, apart from magnesium dichloride or magnesium dibromide, the di(C$_1$-C$_{10}$-alkyl) magnesium compounds.

Particular preference is given to using Ziegler catalysts which are commercially available, e.g. from Grace.

Suitable catalysts B) are late transition metal complexes of the formula (I),

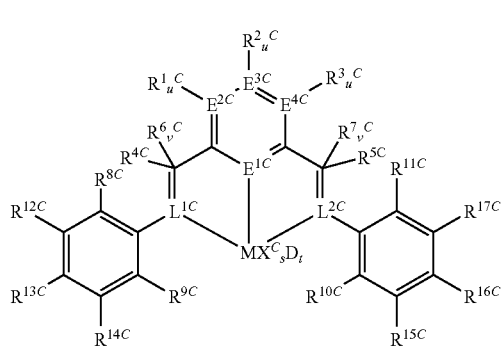

where the variables have the following meanings:
M is Fe or Co,
$E^{1C}$ is nitrogen or phosphorus, preferably nitrogen,
$E^{2C}$-$E^{4C}$ are each, independently of one another, carbon, nitrogen or phosphorus, preferably carbon,
$R^{1C}$-$R^{3C}$ are each, independently of one another, hydrogen, $C_1$-$C_{22}$-alkyl, $C_2$-$C_{22}$-alkenyl, $C_6$-$C_{22}$-aryl, alkylaryl having from 1 to 10 carbon atoms in the alkyl radical and 6-20 carbon atoms in the aryl radical, halogen, $NR^{18C}{}_2$, $OR^{18C}$, $SiR^{19C}{}_3$, where the organic radicals $R^{1C}$-$R^{3C}$ may also be substituted by halogens and/or two vicinal radicals $R^{1C}$-$R^{3C}$ may also be joined to form a five-, six- or seven-membered ring and/or two vicinal radicals $R^{1C}$-$R^{3C}$ may be joined to form a five-, six- or seven-membered heterocycle comprising at least one atom from the group consisting of N, P, O and S,
$R^{4C}$-$R^{7C}$ are each, independently of one another, hydrogen, $C_1$-$C_{22}$-alkyl, $C_2$-$C_{22}$-alkenyl, $C_6$-$C_{22}$-aryl, alkylaryl having from 1 to 10 carbon atoms in the alkyl radical and 6-20 carbon atoms in the aryl radical, $NR^{18C}{}_2$, $SiR^{19C}{}_3$, where the organic radicals $R^{4C}$-$R^{7C}$ may also be substituted by halogens and/or two geminal or vicinal radicals $R^{4C}$-$R^{7C}$ may also be joined to form a five-, six- or seven-membered ring and/or two geminal or vicinal radicals $R^{4C}$-$R^{9C}$ may be joined to form a five-, six- or seven-membered heterocycle comprising at least one atom from the group consisting of N, P, O and S and, when v is 0, $R^{6C}$ is a bond to $L^{1C}$ and/or $R^{7C}$ is a bond to $L^{2C}$ so that $L^{1C}$ forms a double bond to the carbon atom bearing $R^{4C}$ and/or $L^{2C}$ forms a double bond to the carbon atom bearing $R^{5C}$,
u is 0 when $E^{2C}$-$E^{4C}$ is nitrogen or phosphorus and is 1 when $E^{2C}$-$E^{4C}$ is carbon,
$L^{1C}$-$L^{2C}$ are each, independently of one another, nitrogen or phosphorus, in particular nitrogen,
$R^{8C}$-$R^{11C}$ are each, independently of one another, $C_1$-$C_{22}$-alkyl, $C_2$-$C_{22}$-alkenyl, $C_6$-$C_{22}$-aryl, alkylaryl having from 1 to 10 carbon atoms in the alkyl radical and 6-20 carbon atoms in the aryl radical or a halogen,
$R^{12C}$-$R^{17C}$ are each, independently of one another, hydrogen, $C_1$-$C_{22}$-alkyl, $C_2$-$C_{22}$-alkenyl, $C_6$-$C_{22}$-aryl, alkylaryl having from 1 to 10 carbon atoms in the alkyl radical and 6-20 carbon atoms in the aryl radical, halogen, $NR^{18C}{}_2$, $OR^{18C}$, $SiR^{19C}{}_3$, where the organic radicals $R^{12C}$-$R^{17C}$ may also be substituted by halogens and/or two vicinal radicals $R^{8C}$-$R^{17C}$ may also be joined to form a five-, six- or seven-membered ring and/or two vicinal radicals $R^{8C}$-$R^{17C}$ are joined to form a five-, six- or seven-membered heterocycle comprising at least one atom from the group consisting of N, P, O and S,
v is independently 0 or 1,
the radicals $X^C$ are each, independently of one another, fluorine, chlorine, bromine, iodine, hydrogen, $C_1$-$C_{10}$-alkyl, $C_2$-$C_{10}$-alkenyl, $C_6$-$C_{20}$-aryl, alkylaryl having from 1-10 carbon atoms in the alkyl radical and 6-20 carbon atoms in the aryl radical, $NR^{18C}{}_2$, $OR^{18C}$, $SR^{18C}$, $SO_3R^{18C}$, $OC(O)R^{18C}$, CN, SCN, β-diketonate, CO, $BF_4^-$, $PF_6^-$ or bulky noncoordinating anions and the radicals $X^C$ may optionally be joined to one another,
the radicals $R^{18C}$ are each, independently of one another, hydrogen, $C_1$-$C_{20}$-alkyl, $C_2$-$C_{20}$-alkenyl, $C_6$-$C_{20}$-aryl, alkylaryl having from 1 to 10 carbon atoms in the alkyl radical and 6-20 carbon atoms in the aryl radical, $SiR^{19C}{}_3$, where the organic radicals $R^{18C}$ may also be substituted by halogens or nitrogen- and oxygen-comprising groups and two radicals $R^{18C}$ may also be joined to form a five- or six-membered ring,
the radicals $R^{19C}$ are each, independently of one another, hydrogen, $C_1$-$C_{20}$-alkyl, $C_2$-$C_{20}$-alkenyl, $C_6$-$C_{20}$-aryl, alkylaryl having from 1 to 10 carbon atoms in the alkyl radical and 6-20 carbon atoms in the aryl radical, where the organic radicals $R^{19C}$ may also be substituted by halogens or nitrogen- and oxygen-comprising groups and two radicals $R^{19C}$ may also be joined to form a five- or six-membered ring,
s is 1, 2, 3 or 4, preferably 2 or 3,
D is an uncharged donor and
t is from 0 to 4, preferably 0, 1 or 2.

The three atoms $E^{2C}$ to $E^{4C}$ in a molecule can be identical or different. If $E^{1C}$ is phosphorus, then $E^{2C}$ to $E^{4C}$ are preferably carbon. If $E^{1C}$ is nitrogen, then $E^{2C}$ to $E^{4C}$ are preferably nitrogen or carbon, preferably carbon.

The substituents $R^{1C}$-$R^{3C}$ and $R^{12C}$-$R^{17C}$ can be varied within a wide range. Possible organic substituents $R^{1C}$-$R^{3C}$ and $R^{12C}$-$R^{17C}$ are, for example, the following: $C_1$-$C_{22}$-alkyl which may be linear or branched, e.g. methyl, ethyl, n-propyl, isopropyl, n-butyl, isobutyl, tert-butyl, n-pentyl, n-hexyl, n-heptyl, n-octyl, n-nonyl, n-decyl or n-dodecyl, 5- to 7-membered cycloalkyl which may in turn bear a $C_1$-$C_{10}$-alkyl group and/or $C_6$-$C_{10}$-aryl group as substituent, e.g. cyclopropane, cyclobutane, cyclopentane, cyclohexane, cycloheptane, cyclooctane, cyclononane or cyclododecane, $C_2$-$C_{22}$-alkenyl which may be linear, cyclic or branched and in which the double bond may be internal or terminal, e.g. vinyl, 1-allyl, 2-allyl, 3-allyl, butenyl, pentenyl, hexenyl, cyclopentenyl, cyclohexenyl, cyclooctenyl or cyclooctadienyl, $C_6$-$C_{22}$-aryl which may bear further alkyl groups as substituents, e.g. phenyl, naphthyl, biphenyl, anthranyl, o-, m-, p-methylphenyl, 2,3-, 2,4-, 2,5- or 2,6-dimethylphenyl, 2,3,4-, 2,3,5-, 2,3,6-, 2,4,5-, 2,4,6- or 3,4,5-trimethylphenyl, or arylalkyl which may bear further alkyl groups as substituents, e.g. benzyl, o-, m-, p-methylbenzyl, 1- or 2-ethylphenyl, where two radicals $R^{1C}$ to $R^{3C}$ and/or two vicinal radicals $R^{12C}$-$R^{17C}$ may optionally also be joined to form a 5-, 6- or 7-membered ring and/or two of the vicinal radicals $R^{1C}$-$R^{3C}$ and/or two of the vicinal radicals $R^{12C}$-$R^{17C}$ may be joined to form a five-, six- or seven-membered heterocycle comprising at least one atom from the group consisting of N, P, O and S and/or the organic radicals $R^{1C}$-$R^{3C}$ and/or $R^{12C}$-$R^{17C}$ may also be substituted by halogens such as fluorine, chlorine or bromine. Furthermore, $R^{1C}$-$R^{3C}$ and $R^{12C}$-$R^{17C}$ can be amino $NR^{18C}{}_2$ or $N(SiR^{19C}{}_3)_2$, alkoxy or aryloxy $OR^{18C}$, for example dimethylamino, N-pyrrolidinyl, picolinyl, methoxy, ethoxy or isopropoxy, or halogen such as fluorine, chlorine or bromine. In organosilicon substituents $SiR^{19C}_3$, possible radicals $R^{19C}$ are the same carboorganic radicals which have been mentioned in detail above for $R^{1C}$-$R^{3C}$, where two radicals $R^{19C}$ may optionally also be joined to form a 5- or 6-membered ring, e.g. trimethylsilyl, triethylsilyl, butyldimethylsilyl, tributylsilyl, tri-tert-butylsilyl, triallylsilyl, triphenylsilyl or dimethylphenylsilyl. These $SiR^{19C}_3$ radicals can also be bound to $E^{2C}$-$E^{4C}$ via an oxygen or nitrogen, for example trimethylsilyloxy, triethylsilyloxy, butyldimethylsilyloxy, tributylsilyloxy or tri-tert-butylsilyloxy.

Preferred radicals $R^{1C}$-$R^{3C}$ are hydrogen, methyl, trifluoromethyl, ethyl, n-propyl, isopropyl, n-butyl, isobutyl, tert-butyl, n-pentyl, n-hexyl, n-heptyl, n-octyl, vinyl, allyl, benzyl, phenyl, ortho-dialkyl- or ortho-dichloro-substituted phenyls, trialkyl- or trichloro-substituted phenyls, naphthyl, biphenyl and anthranyl. Particularly useful organosilicon substituents are trialkylsilyl groups having from 1 to 10 carbon atoms in the alkyl radical, preferably trimethylsilyl groups.

Preferred radicals $R^{12C}$, $R^{14C}$, $R^{15C}$, $R^{17C}$, are hydrogen, methyl, trifluoromethyl, ethyl, n-propyl, isopropyl, n-butyl, isobutyl, tert-butyl, n-pentyl, n-hexyl, n-heptyl, n-octyl, vinyl, allyl, benzyl, phenyl, fluorine, chlorine and bromine, preferably hydrogen. $R^{12C}$, $R^{14C}$, $R^{15C}$ and $R^{17C}$ are preferably hydrogen.

Preferred radicals $R^{13C}$ and $R^{16C}$ are hydrogen, methyl and chlorine.

Preferred radicals $R^{8C}$ and $R^{10C}$ are halogen, in particular chlorine.

Preferred radicals $R^{9C}$ and $R^{11C}$ are methyl.

Preference is given to $R^{12C}$, $R^{14C}$, $R^{15C}$ and $R^{17C}$ being identical and $R^{13C}$ and $R^{16C}$ being identical. This also preferably applies to the preferred embodiments described above.

The substituents $R^{4C}$-$R^{7C}$ can also be varied within a wide range. Possible organic substituents $R^{4C}$-$R^{7C}$ are, for example, the following: $C_1$-$C_{22}$-alkyl which may be linear or branched, e.g. methyl, ethyl, n-propyl, isopropyl, n-butyl, isobutyl, tert-butyl, n-pentyl, n-hexyl, n-heptyl, n-octyl, n-nonyl, n-decyl or n-dodecyl, 5- to 7-membered cycloalkyl which may in turn bear a $C_1$-$C_{10}$-alkyl group and/or $C_6$-$C_{10}$-aryl group as substituent, e.g. cyclopropane, cyclobutane, cyclopentane, cyclohexane, cycloheptane, cyclooctane, cyclononane or cyclododecane, $C_2$-$C_{22}$-alkenyl which may be linear, cyclic or branched and in which the double bond may be internal or terminal, e.g. vinyl, 1-allyl, 2-allyl, 3-allyl, butenyl, pentenyl, hexenyl, cyclopentenyl, cyclohexenyl, cyclooctenyl or cyclooctadienyl, $C_6$-$C_{22}$-aryl which may bear further alkyl groups as substituents, e.g. phenyl, naphthyl, biphenyl, anthranyl, o-, m-, p-methylphenyl, 2,3-, 2,4-, 2,5- or 2,6-dimethylphenyl, 2,3,4-, 2,3,5-, 2,3,6-, 2,4,5-, 2,4,6- or 3,4,5-trimethylphenyl, or arylalkyl which may bear further alkyl groups as substituents, e.g. benzyl, o-, m-, p-methylbenzyl, 1- or 2-ethylphenyl, where two radicals $R^{4C}$ to $R^{7C}$ may optionally also be joined to form a 5-, 6- or 7-membered ring and/or two geminal radicals $R^{4C}$-$R^{7C}$ may be joined to form a five-, six- or seven-membered heterocycle comprising at least one atom from the group consisting of N, P, O and S and/or the organic radicals $R^{4C}$-$R^{7C}$ may also be substituted by halogens such as fluorine, chlorine or bromine. Furthermore, $R^{4C}$-$R^{7C}$ may be amino, $NR^{18C}_2$ or $N(SiR^{19C}_3)_2$, for example dimethylamino, N-pyrrolidinyl or picolinyl. In organosilicon substituents $SiR^{19C}_3$, possible radicals $R^{19C}$ are the same carboorganic radicals which have been mentioned above for $R^{1C}$-$R^{3C}$, where two radicals $R^{19C}$ may optionally also be joined to form a 5- or 6-membered ring, e.g. trimethylsilyl, triethylsilyl, butyldimethylsilyl, tributylsilyl, tri-tert-butylsilyl, triallylsilyl, triphenylsilyl or dimethylphenylsilyl. These $SiR^{19C}_3$ radicals may also be joined via nitrogen to the carbon bearing them. When v is 0, $R^{6C}$ is a bond to $L^{1C}$ and/or $R^{7C}$ is a bond to $L^{2C}$, so that $L^{1C}$ forms a double bond to the carbon atom bearing $R^{4C}$ and/or $L^{2C}$ forms a double bond to the carbon atom bearing $R^{5C}$.

Preferred radicals $R^{4C}$-$R^{7C}$ are hydrogen, methyl, ethyl, n-propyl, isopropyl, n-butyl, isobutyl, tert-butyl, n-pentyl, n-hexyl, n-heptyl, n-octyl, benzyl, phenyl, ortho-dialkyl- or ortho-dichloro-substituted phenyls, trialkyl- or trichloro-substituted phenyls, naphthyl, biphenyl and anthranyl. Preference is also given to amide substituents $NR^{18C}_2$, in particular secondary amides such as dimethylamide, N-ethylmethylamide, diethylamide, N-methylpropylamide, N-methylisopropylamide, N-ethylisopropylamide, dipropylamide, diisopropylamide, N-methylbutylamide, N-ethylbutylamide, N-methyl-tert-butylamide, N-tert-butylisopropylamide, dibutylamide, di-sec-butylamide, diisobutylamide, tert-amyl-tert-butylamide, dipentylamide, N-methylhexylamide, dihexylamide, tert-amyl-tert-octylamide, dioctylamide, bis(2-ethylhexyl)amide, didecylamide, N-methyloctadecylamide, N-methylcyclohexylamide, N-ethylcyclohexylamide, N-isopropylcyclohexylamide, N-tert-butylcyclohexylamide, dicyclohexylamide, pyrrolidine, piperidine, hexamethylenimine, decahydroquinoline, diphenylamine, N-methylanilide or N-ethylanilide.

$L^{1C}$ and $L^{2C}$ are each, independently of one another, nitrogen or phosphorus, preferably nitrogen, and when v is 0 can form a double bond to the carbon atom bearing $R^{4C}$ or $R^{5C}$. When v is 0, $L^{1C}$ and/or $L^{2C}$ together with the carbon atom bearing $R^{4C}$ or $R^{5C}$ preferably form an imino group —$CR^{4C}$=N— or —$CR^{5C}$=N—. When v is 1, $L^{1C}$ and/or $L^{2C}$ together with the carbon atom bearing $R^{4C}$ or $R^{5C}$ preferably forms an amido group —$CR^{4C}R^{6C}$—$N^-$— or —$CR^{5C}R^{7C}$—$N^-$—.

The ligands $X^C$ are determined, for example, by the choice of the corresponding metal starting compounds which are used for the synthesis of the late transition metal complexes, but can also be varied subsequently. Preferred ligands $X^C$ are the halogens such as fluorine, chlorine, bromine or iodine and preferably chlorine. Alkyl radicals such as methyl, ethyl, propyl, butyl, vinyl, allyl, phenyl or benzyl can also be used as ligands $X^C$. Further ligands $X^C$ are, merely by way of example and not exhaustively, trifluoroacetate, $BF_4^-$, $PF_6^-$ and weakly coordinating or noncoordinating anions (see, for example, S. Strauss in Chem. Rev. 1993, 93, 927-942) such as $B(C_6F_5)_4^-$. Amides, alkoxides, sulfonates, carboxylates and β-diketonates are also particularly suitable ligands $X^C$. Some of these substituted ligands X are particularly preferably used since they can be obtained from cheap and readily available starting materials. Thus, a particularly preferred embodiment is obtained when $X^C$ is dimethylamide, methoxide, ethoxide, isopropoxide, phenoxide, naphthoxide, triflate, p-toluenesulfonate, acetate or acetylacetonate.

Variation of the radicals $R^{18C}$ enables, for example, physical properties such as solubility to be finely adjusted. Possible organic substituents $R^{18C}$ are, for example, the following: $C_1$-$C_{20}$-alkyl which may be linear or branched, e.g. methyl, ethyl, n-propyl, isopropyl, n-butyl, isobutyl, tert-butyl, n-pentyl, n-hexyl, n-heptyl, n-octyl, n-nonyl, n-decyl or n-dodecyl, 5- to 7-membered cycloalkyl which may in turn bear a $C_6$-$C_{10}$-aryl group as substituent, e.g. cyclopropane, cyclobutane, cyclopentane, cyclohexane, cycloheptane, cyclooctane, cyclononane or cyclododecane, $C_2$-$C_{20}$-alkenyl which may be linear, cyclic or branched and in which the double bond can be internal or terminal, e.g. vinyl, 1-allyl, 2-allyl, 3-allyl, butenyl, pentenyl, hexenyl, cyclopentenyl, cyclohexenyl, cyclooctenyl or cyclooctadienyl, $C_6$-$C_{20}$-aryl which may bear further alkyl groups and/or N- or O-comprising radicals as substituents, e.g. phenyl, naphthyl, biphenyl, anthranyl, o-, m-, p-methylphenyl, 2,3-, 2,4-, 2,5- or 2,6-dimethylphenyl, 2,3,4-, 2,3,5-, 2,3,6-, 2,4,5-, 2,4,6- or 3,4,5-trimethylphenyl, 2-methoxyphenyl, 2-N,N-dimethylaminophenyl, or arylalkyl which may bear further alkyl groups as substituents, e.g. benzyl, o-, m-, p-methylbenzyl, 1- or 2-ethylphenyl, where two radicals $R^{18C}$ may optionally also be joined to form a 5- or 6-membered ring and the organic $R^{18C}$ may also be substituted by halogens such as fluorine, chlorine or bromine. In organosilicon substituents $SiR^{19C}_3$, possible radicals $R^{19C}$ are the same radicals which have been mentioned above for $R^{18C}$, where two radicals $R^{19C}$ may optionally also be joined to form a 5- or 6-membered ring, e.g. trimethylsilyl, triethylsilyl, butyldimethylsilyl, tributylsilyl, triallylsilyl, triphenylsilyl or dimethylphenylsilyl. Preference is given to using $C_1$-$C_{10}$-alkyl such as methyl, ethyl, n-propyl, n-butyl, tert-butyl, n-pentyl, n-hexyl, n-heptyl, n-octyl and also vinyl, allyl, benzyl and phenyl as radicals $R^{18C}$.

The number s of the ligands $X^C$ depends on the oxidation state of the late transition metal. The number s can thus not be given in general terms. The oxidation state of the late transition metal complex in catalytically active complexes is usually known to those skilled in the art. However, it is also possible to use complexes whose oxidation state does not correspond to that of the active catalyst. Such complexes can then be appropriately reduced or oxidized by means of suitable activators. Preference is given to iron complexes in the oxidation state +3 or +2.

D is an uncharged donor, preferably an uncharged Lewis base or Lewis acid, for example an amine, alcohol, ether, ketone, aldehyde, ester, sulfide or phosphine, which can be bound to the late transition metal center or else be comprised as residual solvent from the preparation of the late transition metal complexes.

The number t of the ligands D can be from 0 to 4 and is often dependent on the solvents in which the late transition metal complex is prepared and the time for which the resulting complexes are dried and can therefore also be a nonintegral number such as 0.5 or 1.5. t is preferably 0, 1 or 2.

Preferred embodiments are iron complexes of the formula (II)

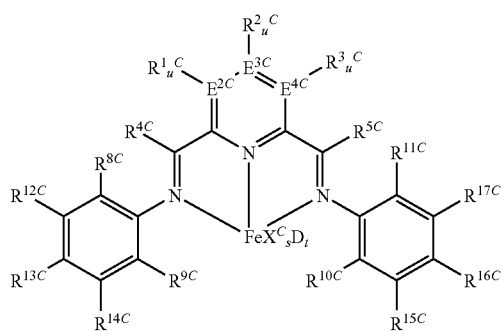

(II)

where
$E^{2C}$-$E^{4C}$ are each, independently of one another, carbon, nitrogen or phosphorus, preferably carbon,
$R^{1C}$-$R^{3C}$ are each, independently of one another, hydrogen, $C_1$-$C_{22}$-alkyl, $C_2$-$C_{22}$-alkenyl, $C_6$-$C_{22}$-aryl, alkylaryl having from 1 to 10 carbon atoms in the alkyl radical and 6-20 carbon atoms in the aryl radical, halogen, $NR^{18C}_2$, $OR^{18C}_2$, $SiR^{19C}_3$, where the organic radicals $R^{1C}$-$R^{3C}$ may also be substituted by halogens and/or two vicinal radicals $R^{1C}$-$R^{3C}$ may also be joined to form a five-, six- or seven-membered ring and/or two vicinal radicals $R^{1C}$-$R^{3C}$ may be joined to form a five-, six- or seven-membered heterocycle comprising at least one atom from the group consisting of N, P, O and S,
$R^{4C}$-$R^{5C}$ are each, independently of one another, hydrogen, $C_1$-$C_{22}$-alkyl, $C_2$-$C_{22}$-alkenyl, $C_6$-$C_{22}$-aryl, alkylaryl having from 1 to 10 carbon atoms in the alkyl radical and 6-20 carbon atoms in the aryl radical, $NR^{18C}_2$, $SiR^{19C}_3$, where the organic radicals $R^{4C}$-$R^{5C}$ may also be substituted by halogens,
u is 0 when $E^{2C}$-$E^{4C}$ is nitrogen or phosphorus and is 1 when $E^{2C}$-$E^{4C}$ is carbon,
$L^{1C}$-$L^{2C}$ are each, independently of one another, nitrogen or phosphorus, preferably nitrogen,
$R^{8C}$-$R^{11C}$ are each, independently of one another, $C_1$-$C_{22}$-alkyl, $C_2$-$C_{22}$-alkenyl, $C_6$-$C_{22}$-aryl, alkylaryl having from 1 to 10 carbon atoms in the alkyl radical and 6-20 carbon atoms in the aryl radical, halogen, i.e. F, Cl, Br, I,
$R^{12C}$-$R^{17C}$ are each, independently of one another, hydrogen, $C_1$-$C_{22}$-alkyl, $C_2$-$C_{22}$-alkenyl, $C_6$-$C_{22}$-aryl, alkylaryl having from 1 to 10 carbon atoms in the alkyl radical and 6-20 carbon atoms in the aryl radical, halogen, $NR^{18C}_2$, $OR^{18C}$, $SiR^{19C}_3$, where the organic radicals $R^{12C}$-$R^{17C}$ may also be substituted by halogens and/or two vicinal radicals $R^{12C}$-$R^{17C}$ may also be joined to form a five-, six- or seven-membered ring and/or two vicinal radicals $R^{8C}$-$R^{17C}$ may be joined to form a five-, six- or seven-membered heterocycle comprising at least one atom from the group consisting of N, P, O and S,
v is independently 0 or 1,
the radicals $X^C$ are each, independently of one another, fluorine, chlorine, bromine, iodine, hydrogen, $C_1$-$C_{10}$-alkyl, $C_2$-$C_{10}$-alkenyl, $C_6$-$C_{20}$-aryl, alkylaryl having 1-10 carbon atoms in the alkyl radical and 6-20 carbon atoms in the aryl radical, $NR^{18C}_2$, $OR^{18C}$, $SR^{18C}$, $SO_3R^{18C}$, $OC(O)R^{18C}$, CN, SCN, β-diketonate, CO, $BF_4^-$, $PF_6^-$ or bulky noncoordinating anions and the radicals $X^C$ may optionally be joined to one another,
the radicals $R^{18C}$ are each, independently of one another, hydrogen, $C_1$-$C_{20}$-alkyl, $C_2$-$C_{20}$-alkenyl, $C_6$-$C_{20}$-aryl, alkylaryl having from 1 to 10 carbon atoms in the alkyl radical and 6-20 carbon atoms in the aryl radical, $SiR^{19C}_3$, where the organic radicals $R^{18C}$ may also bear halogens or nitrogen- and oxygen-comprising groups as substituents and two radicals $R^{18C}$ may also be joined to form a five- or six-membered ring,
the radicals $R^{19C}$ are each, independently of one another, hydrogen, $C_1$-$C_{20}$-alkyl, $C_2$-$C_{20}$-alkenyl, $C_6$-$C_{20}$-aryl, alkylaryl having from 1 to 10 carbon atoms in the alkyl radical and 6-20 carbon atoms in the aryl radical, where the organic radicals $R^{19C}$ may also bear halogens or nitrogen- and oxygen-comprising groups as substituents and two radicals $R^{19C}$ may also be joined to form a five- or six-membered ring,
s is 1, 2, 3 or 4, preferably 2 or 3,
D is an uncharged donor and
t is from 0 to 4, preferably 0, 1 or 2.

The embodiments described above and the preferred embodiments likewise apply to $R^{2C}$-$E^{4C}$, $R^{1C}$-$R^{3C}$, $X^C$, $R^{18C}$ and $R^{19C}$.

The substituents $R^{4C}$-$R^{5C}$ can be varied within a wide range. Possible organic substituents $R^{4C}$-$R^{5C}$ are, for example, the following: hydrogen, $C_1$-$C_{22}$-alkyl which may be linear or branched, e.g. methyl, ethyl, n-propyl, isopropyl, n-butyl, isobutyl, tert-butyl, n-pentyl, n-hexyl, n-heptyl, n-octyl, n-nonyl, n-decyl or n-dodecyl, 5- to 7-membered cycloalkyl which may in turn bear a $C_1$-$C_{10}$-alkyl group and/or $C_6$-$C_{10}$-aryl group as substituent, e.g. cyclopropane, cyclobutane, cyclopentane, cyclohexane, cycloheptane, cyclooctane, cyclononane or cyclododecane, $C_2$-$C_{22}$-alkenyl which may be linear, cyclic or branched and in which the double bond may be internal or terminal, e.g. vinyl, 1-allyl, 2-allyl, 3-allyl, butenyl, pentenyl, hexenyl, cyclopentenyl, cyclohexenyl, cyclooctenyl or cyclooctadienyl, $C_6$-$C_{22}$-aryl which may bear further alkyl groups as substituents, e.g. phenyl, naphthyl, biphenyl, anthranyl, o-, m-, p-methylphenyl, 2,3-, 2,4-, 2,5- or 2,6-dimethylphenyl, 2,3,4-, 2,3,5-, 2,3,6-, 2,4,5-, 2,4,6- or 3,4,5-trimethylphenyl, or arylalkyl which may bear further alkyl groups as substituents, e.g. benzyl, o-, m-, p-methylbenzyl, 1- or 2-ethylphenyl, where the organic radicals $R^{4C}$-$R^{5C}$ may optionally also be substituted by halogens such as fluorine, chlorine or bromine. Furthermore, $R^{4C}$-$R^{5C}$ can be amino $NR^{18C}_2$ or $N(SiR^{19C}_3)_2$, for example dimethylamino, N-pyrrolidinyl or picolinyl. In organosilicon substituents $SiR^{19C}_3$, possible radicals $R^{19C}$ are the same organic radicals as have been mentioned above for $R^{1C}$-$R^{3C}$, where two radicals $R^{19C}$ may optionally also be joined to form a 5- or 6-membered ring, e.g. trimethylsilyl, triethylsilyl, butyldimethylsilyl, tributylsilyl, tri-tert-butylsilyl, triallylsilyl, triphenylsilyl or dimethylphenylsilyl. These $SiR^{19C}_3$ radicals can also be bound via nitrogen to the carbon bearing them.

Preferred radicals $R^{4C}$-$R^{5C}$ are hydrogen, methyl, ethyl, n-propyl, isopropyl, n-butyl, isobutyl, tert-butyl, n-pentyl, n-hexyl, n-heptyl, n-octyl or benzyl, preferably methyl.

The substituents $R^{12C}$-$R^{17C}$ can be varied within a wide range. Possible organic substituents $R^{12C}$-$R^{17C}$ are, for example, the following: $C_1$-$C_{22}$-alkyl which may be linear or branched, e.g. methyl, ethyl, n-propyl, isopropyl, n-butyl, isobutyl, tert-butyl, n-pentyl, n-hexyl, n-heptyl, n-octyl, n-nonyl, n-decyl or n-dodecyl, 5- to 7-membered cycloalkyl which may in turn bear a $C_1$-$C_{10}$-alkyl group and/or $C_6$-$C_{10}$-aryl group as substituent, e.g. cyclopropane, cyclobutane, cyclopentane, cyclohexane, cycloheptane, cyclooctane, cyclononane or cyclododecane, $C_2$-$C_{22}$-alkenyl which may be linear, cyclic or branched and in which the double bond can be internal or terminal, e.g. vinyl, 1-allyl, 2-allyl, 3-allyl, butenyl, pentenyl, hexenyl, cyclopentenyl, cyclohexenyl, cyclooctenyl or cyclooctadienyl, $C_6$-$C_{22}$-aryl which may bear further alkyl groups as substituents, e.g. phenyl, naphthyl, biphenyl, anthranyl, o-, m-, p-methylphenyl, 2,3-, 2,4-, 2,5- or 2,6-dimethylphenyl, 2,3,4-, 2,3,5-, 2,3,6-, 2,4,5-, 2,4,6- or 3,4,5-trimethylphenyl, or arylalkyl which may bear further alkyl groups as substituents, e.g. benzyl, o-, m-, p-methylbenzyl, 1- or 2-ethylphenyl, where two radicals $R^{12C}$ to $R^{17C}$ may optionally also be joined to form a 5-, 6- or 7-membered ring and/or two vicinal radicals $R^{12C}$-$R^{17C}$ may be joined to form a five-, six- or seven-membered heterocycle comprising at least one atom from the group consisting of N, P, O and S and/or the organic radicals $R^{12C}$-$R^{17C}$ may also be substituted by halogens such as fluorine, chlorine or bromine. Furthermore, $R^{12C}$-$R^{17C}$ can be halogen such as fluorine, chlorine, bromine, amino $NR^{18C}_2$ or $N(SiR^{19C}_3)_2$, alkoxy or aryloxy $OR^{18C}$, for example dimethylamino, N-pyrrolidinyl, picolinyl, methoxy, ethoxy or isopropoxy. In organosilicon substituents $SiR^{19C}_3$, possible radicals $R^{19C}$ are the same carboorganic radicals as mentioned above for $R^{1C}$-$R^{3C}$, where two radicals $R^{19C}$ may optionally also be joined to form a 5- or 6-membered ring, e.g. trimethylsilyl, triethylsilyl, butyldimethylsilyl, tributylsilyl, tri-tert-butylsilyl, triallylsilyl, triphenylsilyl or dimethylphenylsilyl. These $SiR^{19C}_3$ radicals may also be bound via oxygen or nitrogen, for example trimethylsilyloxy, triethylsilyloxy, butyldimethylsilyloxy, tributylsilyloxy or tri-tert-butylsilyloxy.

Preferred radicals $R^{12C}$, $R^{14C}$, $R^{15C}$, $R^{17C}$ are hydrogen, methyl, trifluoromethyl, ethyl, n-propyl, isopropyl, n-butyl, isobutyl, tert-butyl, n-pentyl, n-hexyl, n-heptyl, n-octyl, vinyl, allyl, benzyl, phenyl, fluorine, chlorine and bromine, preferably hydrogen. The Radicals $R^{12C}$, $R^{14C}$, $R^{15C\ and\ R17C}$ are preferably hydrogen.

Preferred radicals $R^{13C}$ and $R^{16C}$ are hydrogen, methyl and chlorine.

Preferred radicals $R^{8C}$ and $R^{10C}$ are halogen, in particular chlorine.

Preferred radicals $R^{9C}$ and $R^{11C}$ are methyl.

Preference is given to $R^{12C}$, $R^{14C}$, $R^{15C}$ and $R^{17C}$ being identical and $R^{13C}$ and $R^{16C}$ being identical. This preferably also applies to the preferred embodiments described above.

The preparation of the compounds B) is described, for example, in J. Am. Chem. Soc. 120, p. 4049 ff. (1998), J. Chem. Soc., Chem. Commun. 1998, 849 and WO 98/27124. Preferred complexes B) are 2,6-diacetylpyridinebis(2,6-dimethylphenylimine)iron dichloride, 2,6-diacetylpyridinebis(2,4,6-trimethylphenylimine)iron dichloride, 2,6-diacetylpyridinebis(2-chloro-6-methylphenylimine)iron dichloride, 2,6-diacetylpyridinebis(2,6-diisopropylphenylimine)iron dichloride, 2,6-diacetylpyridinebis(2,6-dichlorophenylimine)iron dichloride, 2,6-pyridinedicarboxaldehydebis (2,6-diisopropylphenylimine)iron dichloride, diacetylpyridinebis(2,6-dichlorophenylimine)iron dichloride, diacetylpyridinebis(2,6-difluorophenylimine)iron dichloride, diacetylpyridinebis(2,6-dibromophenylimine)iron dichloride or the respective dibromides or tribromides.

The catalyst composition of the invention can be used either alone or together with further components as catalyst system for olefin polymerization. Furthermore, we have found catalyst systems for olefin polymerization which comprise A) at least one polymerization catalyst of a Ziegler type,
B) at least one polymerization catalyst based on a late transition metal component having a tridentate ligand which bears at least two ortho,ortho-disubstituted aryl radicals,
C) optionally one or more activating compounds,
D) optionally one or more organic or inorganic supports,
E) optionally one or more metal compounds comprising a metal of group 1, 2 or 13 of the Periodic Table.

The Ziegler catalyst (A) and/or the late transition metal complex (B) themselves sometimes have only little polymerization activity and are then brought into contact with one or more activators, viz. the component (C), in order to be able to display good polymerization activity. Furthermore, the catalyst system therefore optionally comprises one or more activating compounds as component (C), preferably one or two activating compounds or activators (C). Activation of the Ziegler component (A) and of the late transition metal complex (B) of the catalyst composition can be carried out using the same activator or activator mixture or different activators. It is often advantageous to use the same activator (C) for both catalysts (A) and (B).

Suitable compounds (C) which are able to react with the Ziegler-Natta catalyst (A) or with the late transition metal complex (B) to convert this into a catalytically active or more active compound are, for example, compounds such as an aluminoxane, a strong uncharged Lewis acid, an ionic compound having a Lewis-acid cation or an ionic compound having a Brönsted acid as cation.

As aluminoxanes, it is possible to use, for example, the compounds described in WO 00/31090. Particularly suitable aluminoxanes are open-chain or cyclic aluminoxane compounds of the general formula (III) or (IV)

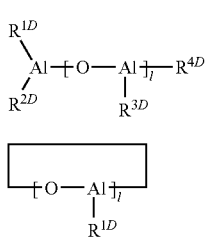

where $R^{1D}$-$R^{4D}$ are each, independently of one another, a $C_1$-$C_6$-alkyl group, preferably a methyl, ethyl, butyl or isobutyl group, and l is an integer from 1 to 40, preferably from 4 to 25.

A particularly suitable aluminoxane compound is methylaluminoxane.

These oligomeric aluminoxane compounds are usually prepared by controlled reaction of a solution of trialkylaluminum, preferably trimethylaluminum, with water. In general, the oligomeric aluminoxane compounds obtained in this way are present as mixtures of both linear and cyclic chain molecules of various lengths, so that l is to be regarded as an average. The aluminoxane compounds can also be present in admixture with other metal alkyls, usually with aluminum alkyls. Aluminoxane preparations suitable as component (C) are commercially available.

Furthermore, modified aluminoxanes in which some of the hydrocarbon radicals have been replaced by hydrogen atoms or alkoxy, aryloxy, siloxy or amide radicals can also be used in place of the aluminoxane compounds of the general formula (III) or (IV) as component (C).

A further type of suitable activating component (C) is hydroxyaluminoxanes. These can be prepared, for example, by addition of from 0.5 to 1.2 equivalents of water, preferably from 0.8 to 1.2 equivalents of water, per equivalent of aluminum of an alkylaluminum compound, particularly preferably triisobutylaluminum, at low temperatures, usually below 0° C. Such compounds and their use in olefin polymerization are described, for example, in WO 00/24787. The atomic ratio of aluminum from the hydroxyaluminoxane compound to the transition metal from the Ziegler catalyst (A) or the late transition metal complex (B) is usually in the range from 1:1 to 100:1, preferably from 10:1 to 50:1 and particularly preferably in the range from 20:1 to 40:1.

As strong, uncharged Lewis acids, preference is given to compounds of the general formula (V)

$$M^{2D}X^{1D}X^{2D}X^{3D} \qquad (V)$$

where $M^{2D}$ is an element of group 13 of the Periodic Table of the Elements, preferably B, Al or Ga, more preferably B, $X^{1D}$, $X^{2D}$ and $X^{3D}$ are each hydrogen, $C_1$-$C_{10}$-alkyl, $C_6$-$C_{15}$-aryl, alkylaryl, arylalkyl, haloalkyl or haloaryl each having from 1 to 10 carbon atoms in the alkyl radical and from 6 to 20 carbon atoms in the aryl radical or fluorine, chlorine, bromine or iodine, preferably a haloaryl, more preferably pentafluorophenyl.

Further examples of strong, uncharged Lewis acids are mentioned in WO 00/31090.

Suitable aluminum compounds (C) are trialkylaluminum and compounds derived therefrom in which an alkyl group has been replaced by an alkoxy group or by a halogen atom, for example by chlorine or bromine. The alkyl groups can be identical or different. Both linear and branched alkyl groups are possible. Preference is given to using trialkylaluminum compounds whose alkyl groups each have from 1 to 8 carbon atoms, for example trimethylaluminum, triethylaluminum, triisobutylaluminum, trioctylaluminum or methyldiethylaluminum or mixtures thereof.

Compounds suitable as component (C) also include boranes and boroxins, e.g. trialkylborane, triarylborane or trimethylboroxin. Particular preference is given to using boranes which bear at least two perfluorinated aryl radicals. Particular preference is given to compounds of the general formula (V) in which $X^{1D}$, $X^{2D}$ and $X^{3D}$ are identical, for example triphenylborane, tris(4-fluorophenyl)borane, tris(3,5-difluorophenyl)borane, tris(4-fluoromethylphenyl)borane, tris(pentafluorophenyl)borane, tris(tolyl)borane, tris(3,5-dimethylphenyl)borane, tris(3,5-difluorophenyl)borane or tris(3,4,5 trifluorophenyl)borane. Tris(pentafluorophenyl) borane is preferably used.

Suitable compounds (C) are preferably prepared by reaction of aluminum or boron compounds of the formula (V) with water, alcohols, phenol derivatives, thiophenol derivatives or aniline derivatives, with the halogenated and especially the perfluorinated alcohols and phenols being of particular importance. Examples of particularly suitable compounds are pentafluorophenol, 1,1-bis(pentafluorophenyl)methanol and 4-hydroxy-2,2',3,3',4',5,5',6,6'-nonafluorobiphenyl. Examples of combinations of compounds of the formula (V) with Brönsted acids are first and foremost trimethylaluminum/pentafluorophenol, trimethylaluminum/1-bis(pentafluorophenyl)methanol, trimethylaluminum/4-hydroxy-2,2',3,3',4',5,5',6,6'-nonafluorobiphenyl, triethylaluminum/pentafluorophenol, triisobutylaluminum/pentafluorophenol and triethylaluminum/4,4'-dihydroxy-2,2',3,3',5,5',6,6'-octafluorobiphenyl hydrate.

In further suitable aluminum and boron compounds of the formula (V), $X^{1D}$ is an OH group, as in, for example, boronic acids and borinic acids, with preference being given to borinic acids having perfluorinated aryl radicals, for example $(C_6F_5)_2BOH$.

Strong uncharged Lewis acids which are suitable as activating compounds (C) also include the reaction products from the reaction of a boric acid with two equivalents of an aluminum trialkyl or the reaction products from the reaction of an aluminum trialkyl with two equivalents of an acidic fluorinated, preferably perfluorinated, hydrocarbon compound such as pentafluorophenol or bis(pentafluorophenyl)borinic acid.

Suitable ionic compounds having Lewis-acid cations are salt-like compounds of the cation of the general formula (VI)

$$[((M^{3D})^{a+})Q_1Q_2 \ldots Q_z]^{d+} \qquad (VI)$$

where $M^{3D}$ is an element of groups 1 to 16 of the Periodic Table of the Elements, $Q_1$ to $Q_z$ are singly negatively charged radicals such as $C_1$-$C_{28}$-alkyl, $C_6$-$C_{15}$-aryl, alkylaryl, arylalkyl, haloalkyl, haloaryl each having from 6 to 20 carbon atoms in the aryl radical and from 1 to 28 carbon atoms in the alkyl radical, $C_3$-$C_{10}$-cycloalkyl which may optionally bear $C_1$-$C_{10}$-alkyl groups as substituents, halogen, $C_1$-$C_{28}$-alkoxy, $C_6$-$C_{15}$-aryloxy, silyl or mercaptyl groups, a is an integer from 1 to 6 and z is an integer from 0 to 5, d corresponds to the difference a-z, but d is greater than or equal to 1.

Particularly useful cations are carbonium cations, oxonium cations and sulfonium cations and also cationic transition metal complexes. Preference is given to the triphenylmethyl cation, the silver cation and the 1,1'-dimethylferrocenyl cation. They preferably have noncoordinating counterions, in particular boron compounds as are also mentioned in WO 91/09882, preferably tetrakis(pentafluorophenyl)borate.

Salts having noncoordinating anions can also be prepared by combining a boron or aluminum compound, e.g. an aluminum alkyl, with a second compound which can react to link two or more boron or aluminum atoms, e.g. water, and a third compound which forms an ionizing ionic compound with the boron or aluminum compound, e.g. triphenylchloromethane, or optionally a base, preferably an organic nitrogen-comprising base such as an amine, an aniline derivative or a nitrogen heterocycle. In addition, a fourth compound which likewise reacts with the boron or aluminum compound, e.g. pentafluorophenol, can be added.

Ionic compounds having Brönsted acids as cations preferably likewise have noncoordinating counterions. As Brönsted acids, particular preference is given to protonated amine or aniline derivatives. Preferred cations are N,N-dimethylanilinium, N,N-dimethylcyclohexylammonium and N,N-dimethylbenzylammonium and also derivatives of the latter two.

Compounds having anionic boron heterocycles as are described in WO 9736937 are also suitable as component C), preferably dimethylanilinium boratabenzenes or tritylboratabenzenes.

Preferred ionic compounds C) comprise borates which bear at least two perfluorinated aryl radicals. Particular preference is given to N,N-dimethylanilinium tetrakis(pentafluorophenyl)borate and preferably N,N-dimethylcyclohexylammonium tetrakis(pentafluorophenyl)borate, N,N-dimethylbenzylammonium tetrakis(pentafluorophenyl)borate or trityl tetrakispentafluorophenylborate.

It is also possible for two or more borate anions to be joined to one another, as in the dianion $[(C_6F_5)_2B-C_6F_4-B(C_6F_5)_2]^{2-}$, or the borate anion can be bound via a bridge to a suitable functional group on the support surface.

Further suitable activating compounds (C) are listed in WO 00/31090.

The amount of strong, uncharged Lewis acids, ionic compounds having Lewis-acid cations or ionic compounds having Brönsted acids as cations is preferably from 0.1 to 20 equivalents, preferably from 1 to 10 equivalents and particularly preferably from 1 to 2 equivalents, based on the Ziegler catalyst (A) or the late transition metal complex (B).

Suitable activating compounds (C) also include boron-aluminum compounds such as di[bis(pentafluorophenyl)boroxy]methylalane. Corresponding boron-aluminum compounds are, for example, those disklosed in WO 99/06414.

It is also possible to use mixtures of all the abovementioned activating compounds (C). Preferred mixtures comprise aluminoxanes, preferably methylaluminoxane, and an ionic compound, preferably one comprising the tetrakis(pentafluorophenyl)borate anion, and/or a strong uncharged Lewis acid, preferably tris(pentafluorophenyl)borane or a boroxin.

Both the Ziegler catalyst (A) and the late transition metal complex (B) and also the activating compounds (C) are preferably used in a solvent, with preference being given to aromatic hydrocarbons having from 6 to 20 carbon atoms, in particular xylenes, toluene, pentane, hexane, heptane or mixtures of these.

Furthermore, it is possible to use an activating compound (C) which can at the same time be used as support (D). Such systems are obtained, for example, from an inorganic oxide treated with zirconium alkoxide and subsequent chlorination, e.g. by means of carbon tetrachloride. The preparation of such systems is described, for example, in WO 01/41920.

The combinations of the preferred embodiments of (C) with the preferred embodiments of (A) and/or (B) are particularly preferred.

As joint activator (C) for the catalyst components (A) and (B), preference is given to using an aluminoxane. Further particularly useful joint activators (C) are the reaction products of aluminum compounds of the formula (V) with perfluorinated alcohols and phenols.

To enable the Ziegler component (A) and the late transition metal complex (B) to be used in the gas phase or in suspension in polymerization processes, it is often advantageous for the complexes to be used in the form of a solid, i.e. for them to be applied to a solid support (D). Furthermore, the supported complexes have a high productivity. The Ziegler catalysts (A) and/or the late transition metal complex (B) can therefore optionally be immobilized on an organic or inorganic support (D) and be used in supported form in the polymerization. This enables, for example, deposits in the reactor to be avoided and the polymer morphology to be controlled. As support materials, preference is given to using silica gel, magnesium chloride, aluminum oxide, mesoporous materials, aluminosilicates, hydrotalcites and organic polymers such as polyethylene, polypropylene, polystyrene, polytetrafluoroethylene or polymers having polar functional groups, for example copolymers of ethene and acrylic esters, acrolein or vinyl acetate.

Particular preference is given to a catalyst system comprising at least one Ziegler catalyst (A), at least one late transition metal complex (B), at least one activating compound (C) and at least one support component (D).

The preferred catalyst composition according to the invention comprises one or more support components. It is possible for both the Ziegler component (A) and the late transition metal complex (B) to be supported, or only one of the two components can be supported. In a preferred variant, both components (A) and (B) are supported. The two components (A) and (B) can have been applied to different supports or together to a joint support. The components (A) and (B) are preferably applied to a joint support in order to ensure relative spatial proximity of the various catalyst sites and thus achieve good mixing of the different polymers formed.

To produce the catalyst systems of the invention, one of the components (A) and one of the components (B) and/or activator (C) are preferably immobilized on the support (D) by physisorption or by means of a chemical reaction, i.e. covalent bonding of the components, with reactive groups of the support surface.

The order in which support component (D), Ziegler catalyst (A), late transition metal complex (B) and the activating compound (C) are combined is in principle immaterial. After the individual process steps, the various intermediates can be washed with suitable inert solvents, e.g. aliphatic or aromatic hydrocarbons.

Ziegler catalyst (A), late transition metal complex (B) and the activating compound (C) can be immobilized independently of one another, e.g. in succession or simultaneously. Thus, the support component (D) can firstly be brought into contact with the activating compound or compounds (C) or the support component (D) can firstly be brought into contact with the Ziegler catalyst (A) and/or the late transition metal complex (B). Preactivation of the Ziegler catalyst (A) with one or more activating compounds (C) before mixing with the support (D) is also possible. The late transition metal component can, for example, be reacted simultaneously with the transition metal complex with the activating compound (C) or can be preactivated separately by means of this. The preactivated late transition metal complex (B) can be applied to the support before or after the preactivated Ziegler catalyst (A). In one possible embodiment, the Ziegler catalyst (A) and/or the late transition metal complex (B) can also be prepared in the presence of the support material. A further method of immobilization is prepolymerization of the catalyst system with or without prior application to a support.

The immobilization is generally carried out in an inert solvent which can be filtered off or evaporated after the immobilization. After the individual process steps, the solid can be washed with suitable inert solvents, e.g. aliphatic or aromatic hydrocarbons, and dried. The use of the still moist, supported catalyst is also possible.

In a preferred form of the preparation of the supported catalyst system, at least one late transition metal complex (B) is brought into contact with an activating compound (C) and subsequently mixed with the dehydrated or passivated support material (D). The Ziegler catalyst (A) is likewise brought into contact with at least one activating compound (C) in a suitable solvent, preferably giving a soluble reaction product, an adduct or a mixture. The preparation obtained in this way is then mixed with the immobilized late transition metal complex, which is used either directly or after separating off the solvent, and the solvent is completely or partly removed. The resulting supported catalyst system is preferably dried to ensure that the solvent is removed completely or largely from the pores of the support material. The supported catalyst is preferably obtained as a free-flowing powder. Examples of the industrial implementation of the above process are described in WO 96/00243, WO 98/40419 or WO 00/05277. A further preferred embodiment comprises firstly applying the activating compound (C) to the support component (D) and subsequently bringing this supported compound into contact with the Ziegler catalyst (A) and the late transition metal complex (B).

As support component (D), preference is given to using finely divided supports which can be any organic or inorganic solid. In particular, the support component (D) can be a porous support such as talc, a sheet silicate such as montmorillonite or mica, an inorganic oxide or a finely divided polymer powder (e.g. polyolefin or polymer having polar functional groups).

The support materials used preferably have a specific surface area in the range from 10 to 1000 m$^2$/g, a pore volume in the range from 0.1 to 5 ml/g and a mean particle size of from 1 to 500 µm. Preference is given to supports having a specific surface area in the range from 50 to 700 m$^2$/g, a pore volume in the range from 0.4 to 3.5 ml/g and a mean particle size in the range from 5 to 350 µm. Particular preference is given to supports having a specific surface area in the range from 200 to 550 m$^2$/g, a pore volume in the range from 0.5 to 3.0 ml/g and a mean particle size of from 10 to 150 µm.

The inorganic support can be subjected to a thermal treatment, e.g. to remove adsorbed water. Such a drying treatment is generally carried out at temperatures in the range from 50 to 1000° C., preferably from 100 to 600° C., with drying at from 100 to 200° C. preferably being carried out under reduced pressure and/or under a blanket of inert gas (e.g. nitrogen), or the inorganic support can be calcined at temperatures of from 200 to 1000° C. to obtain, if appropriate, the desired structure of the solid and/or the desired OH concentration on the surface. The support can also be treated chemically using customary dessicants such as metal alkyls, preferably aluminum alkyls, chlorosilanes or SiCl$_4$ or else methylaluminoxane. Appropriate treatment methods are described, for example, in WO 00/31090.

The inorganic support material can also be chemically modified. For example, the treatment of silica gel with NH$_4$SiF$_6$ or other fluorinating agents leads to fluorination of the silica gel surface or the treatment of silica gels with silanes comprising nitrogen-, fluorine- or sulfur-comprising groups leads to correspondingly modified silica gel surfaces. The support material is preferably not an adduct of the formula MgT$_2$*y AlR$^v_j$(OR$^w$)$_{3-j}$, where Mg is magnesium, T is chlorine, bromine or iodine, Al is aluminum, R$^w$ is a linear or branched C$_1$-C$_{10}$-alkyl radical, y is in the range from 6.00 to 0.05, j is in the range from 3 to 0.1 and R$^v$ represents substituents which are identical or different and are hydrocarbon radicals having from 1 to 20 carbon atoms, e.g. linear or branched, cyclic or acyclic C$_1$-C$_{20}$-alkyls, C$_2$-C$_{20}$-alkenyls, C$_2$-C$_{20}$-alkynyls, C$_6$-C$_{20}$-aryls, C$_7$-C$_{20}$-alkylaryls or C$_7$-C$_{20}$-arylalkyl radicals, which may comprise silicon or germanium atoms.

Organic support materials such as finely divided polyolefin powders (e.g. polyethylene, polypropylene or polystyrene) can also be used and should preferably likewise be freed of adhering moisture, solvent residues or other impurities by means of appropriate purification and drying operations before use. It is also possible to use functionalized polymer supports, e.g. ones based on polystyrene, polyethylene, polypropylene or polybutylene, via whose functional groups, for example ammonium or hydroxyl groups, at least one of the catalyst components can be immobilized. Polymer blends can also be used.

Inorganic oxides suitable as support component (D) may be found in groups 2, 3, 4, 5, 13, 14, 15 and 16 of the Periodic Table of the Elements. Examples of oxides preferred as supports comprise silicon dioxide, aluminum oxide and mixed oxides of the elements calcium, aluminum, silicon, magnesium or titanium and also corresponding oxide mixtures. Other inorganic oxides which can be used either alone or in combination with the abovementioned preferred oxidic supports are, for example, MgO, CaO, AlPO$_4$, ZrO$_2$, TiO$_2$, B$_2$O$_3$ or mixtures thereof.

Further preferred inorganic support materials are inorganic halides such as MgCl$_2$ or carbonates such as Na$_2$CO$_3$, K$_2$CO$_3$, CaCO$_3$, MgCO$_3$, sulfates such as Na$_2$SO$_4$, Al$_2$(SO$_4$)$_3$, BaSO$_4$, nitrates such as KNO$_3$, Mg(NO$_3$)$_2$ or Al(NO$_3$)$_3$.

Preference is given to using silica gels as solid support materials (D) for catalysts for olefin polymerization since this material makes it possible to produce particles whose size and structure make them suitable as supports for olefin polymerization. Spray-dried silica gels, which are spherical agglomerates of smaller granular particles, viz. the primary particles, have been found to be particularly useful here. The silica gels can be dried and/or calcined before use.

The silica gels used are generally used as finely divided powders having a mean particle diameter D50 of from 5 to 200 µm, preferably from 10 to 150 µm, particularly preferably from 15 to 100 µm and more preferably from 20 to 70 µm, and usually have pore volumes of from 0.1 to 10 cm$^3$/g, preferably from 0.2 to 5 cm$^3$/g, and specific surface areas of from 30 to 1000 m$^2$/g, preferably from 50 to 800 m$^2$/g and preferably from 100 to 600 m$^2$/g. The Ziegler catalyst (A) is preferably applied in such an amount that the concentration of the transition metal from the Ziegler catalyst (A) in the finished catalyst system is from 1 to 100 µmol, preferably from 5 to 80 µmol and particularly preferably from 10 to 60 µmol, per g of support (D).

The catalyst system can additionally comprise, as further component (E), a metal compound of the general formula (VII),

$$M^G(R^{1G})_{r^G}(R^{2G})_{s^G}(R^{3G})_{t^G} \quad (VII)$$

where
$M^G$ is Li, Na, K, Be, Mg, Ca, Sr, Ba, boron, aluminum, gallium, indium, thallium, zinc, preferably Li, Na, K, Mg, boron, aluminum or Zn,
$R^{1G}$ is hydrogen, $C_1$-$C_{10}$-alkyl, $C_6$-$C_{15}$-aryl, alkylaryl or arylalkyl each having from 1 to 10 carbon atoms in the alkyl radical and from 6 to 20 carbon atoms in the aryl radical,
$R^{2G}$ and $R^{3G}$ are each hydrogen, halogen, $C_1$-$C_{10}$-alkyl, $C_6$-$C_{15}$-aryl, alkylaryl, arylalkyl or alkoxy each having from 1 to 20 carbon atoms in the alkyl radical and from 6 to 20 carbon atoms in the aryl radical, or alkoxy with $C_1$-$C_{10}$-alkyl or $C_6$-$C_{15}$-aryl,
$r^G$ is an integer from 1 to 3
and
$s^G$ and $t^G$ are integers from 0 to 2, with the sum $r^G+s^G+t^G$ corresponding to the valence of $M^G$,
where the component (E) is usually not identical to the component (C). It is also possible to use mixtures of various metal compounds of the formula (VII).

Among the metal compounds of the general formula (VII), preference is given to those in which
$M^G$ is lithium, magnesium, boron or aluminum and
$R^{1G}$ is $C_1$-$C_{20}$-alkyl.

Particularly preferred metal compounds of the formula (VII) are methyllithium, ethyllithium, n-butyllithium, methylmagnesium chloride, methylmagnesium bromide, ethylmagnesium chloride, ethylmagnesium bromide, butylmagnesium chloride, dimethylmagnesium, diethylmagnesium, dibutylmagnesium, n-butyl-n-octylmagnesium, n-butyl-n-heptyl-magnesium, preferably n-butyl-n-octylmagnesium, tri-n-hexylaluminum, triisobutylaluminum, tri-n-butylaluminum, triethylaluminum, dimethylaluminum chloride, dimethylaluminum fluoride, methylaluminum dichloride, methylaluminum sesquichloride, diethylaluminum chloride and trimethylaluminum and mixtures thereof. The partial hydrolysis products of aluminum alkyls with alcohols can also be used.

If a metal compound (E) is used, it is preferably comprised in the catalyst system in such an amount that the molar ratio of $M^G$ from formula (VII) to the sum of the transition metals from the Ziegler catalyst (A) and the late transition metal complex (B) is from 3000:1 to 0.1:1, preferably from 800:1 to 0.2:1 and particularly preferably from 100:1 to 1:1.

In general, the metal compound (E) of the general formula (VII) is used as constituent of a catalyst system for the polymerization or copolymerization of olefins. Here, the metal compound (E) can, for example, be used for producing a catalyst solid comprising the support (D) and/or be added during or shortly before the polymerization. The metal compounds (E) used can be identical or different. It is also possible, preferably when the catalyst solid does not comprise any activating component (C), for the catalyst system to comprise, in addition to the catalyst solid, one or more activating compounds (C) which are identical to or different from any compounds (E) comprised in the catalyst solid.

The component (E) can likewise be reacted in any order with the components (A), (B) and optionally (C) and (D). The component (A) can, for example, be brought into contact with the components (C) and/or (D) either before or after being brought into contact with the olefins to be polymerized. Precontacting with one or more components (C) before mixing with the olefin and further addition of the same or other components (C) and/or (D) after contacting of this mixture with the olefin is also possible. Preactivation is generally carried out at temperatures of 10-100° C., preferably 20-80° C.

Furthermore, it is possible for the catalyst system firstly to be prepolymerized with α-olefins, preferably linear $C_2$-$C_{10}$-1-alkenes and preferably with ethylene or propylene, and the resulting prepolymerized catalyst solid then to be used in the actual polymerization. The molar ratio of catalyst solid used in the prepolymerization to monomer polymerized onto it is usually in the range from 1:0.1 to 1:1000, preferably from 1:1 to 1:200.

Furthermore, a small amount of an olefin, preferably an α-olefin, for example vinylcyclohexane, styrene or phenyldimethylvinylsilane, as modifying component, an antistatic or a suitable inert compound such as a wax or oil can be added as additive during or after production of the catalyst system. The molar ratio of additives to the sum of Ziegler catalyst (A) and late transition metal complex (B) is usually from 1:1000 to 1000:1, preferably from 1:5 to 20:1.

The catalyst composition of the invention or the catalyst system is suitable for preparing the polyethylene of the invention which has advantageous use and processing properties.

To prepare the polyethylene of the invention, ethylene is, as described above, polymerized with α-olefins having from 3 to 12 carbon atoms.

In the copolymerization process of the invention, ethylene is polymerized with α-olefins having from 3 to 12 carbon atoms. Preferred α-olefins are linear or branched $C_2$-$C_{12}$-1-alkenes, preferably linear $C_2$-$C_{10}$-1-alkenes such as ethene, propene, 1-butene, 1-pentene, 1-hexene, 1-heptene, 1-octene, 1-decene or branched $C_2$-$C_{10}$-1-alkenes such as 4-methyl-1-pentene. Particularly preferred α-olefins are $C_4$-$C_{12}$-1-alkenes, preferably linear $C_6$-$C_{10}$-1-alkenes. It is also possible to polymerize mixtures of various α-olefins. Preference is given to polymerizing at least one α-olefin selected from the group consisting of ethene, propene, 1-butene, 1-pentene, 1-hexene, 1-heptene, 1-octene and 1-decene. Monomer mixtures comprising at least 50 mol % of ethene are preferably used.

The process of the invention for the polymerization of ethylene with α-olefins can be carried out using all industrially known polymerization processes at temperatures in the range from 60 to 350° C., preferably from 0 to 200° C. and particularly preferably from 25 to 150° C., and under pressures of from 0.5 to 4000 bar, preferably from 1 to 100 bar and particularly preferably from 3 to 40 bar. The polymerization can be carried out in a known manner in bulk, in suspension, in the gas phase or in a supercritical medium in the customary reactors used for the polymerization of olefins. It can be carried out batchwise or preferably continuously in one or more stages. High-pressure polymerization processes in tube reactors or autoclaves, solution processes, suspension processes, stirred gas-phase processes and gas-phase fluidized-bed processes are all possible.

The polymerizations are usually carried out at temperatures in the range from −60 to 350° C., preferably in the range from 20 to 300° C., and under pressures of from 0.5 to 4000 bar. The mean residence times are usually from 0.5 to 5 hours, preferably from 0.5 to 3 hours. The advantageous pressure and temperature ranges for carrying out the polymerizations usually depend on the polymerization method. In the case of high-pressure polymerization processes, which are usually carried out at pressures of from 1000 to 4000 bar, preferably from 2000 to 3500 bar, high polymerization temperatures are generally also set. Advantageous temperature ranges for these high-pressure polymerization processes are from 200 to 320° C., preferably from 220 to 290° C. In the case of low-pressure polymerization processes, a temperature which is at least a few degrees below the softening temperature of the polymer is generally set. In particular, temperatures of from 50 to 180° C., preferably from 70 to 120° C., are set in these polymerization processes. In the case of suspension polymerizations, the polymerization is usually carried out in a suspension medium, preferably in an inert hydrocarbon such as isobutane or mixtures of hydrocarbons or else in the monomers themselves. The polymerization temperatures are generally in the range −20 to 115° C. and the pressure is generally in the range from 1 to 100 bar. The solids content of the suspension is generally in the range from 10 to 80%. The polymerization can be carried out either batchwise, e.g. in stirring autoclaves, or continuously, e.g. in tube reactors, preferably in loop reactors. In particular, the Phillips—PF process as described in U.S. Pat. No. 3,242,150 and U.S. Pat. No. 3,248,179 can be employed. The gas-phase polymerization is generally carried out in the range from 30 to 125° C. at pressures of from 1 to 50 bar.

Among the polymerization processes mentioned, gas-phase polymerization, in particular in gas-phase fluidized-bed reactors, solution polymerization and suspension polymerization, in particular in loop reactors and stirred tank reactors, are particularly preferred. The gas-phase polymerization can also be carried out in the condensed or supercondensed mode, in which part of the recycle gas is cooled to below the dew point and recirculated as a two-phase mixture to the reactor. Furthermore, it is possible to use a multizone reactor in which two polymerization zones are linked to one another and the polymer is passed alternately through these two zones a number of times, with the two zones also being able to have different polymerization conditions. Such a reactor is described, for example, in WO 97/04015. The different or identical polymerization processes can, if desired, be connected in series and thus form a polymerization cascade, as, for example, in the Hostalen® process. Operation of two or more identical or different processes in parallel reactors is also possible. Furthermore, molar mass regulators, for example hydrogen, or customary additives such as antistatics can also be concomitantly used in the polymerizations. To obtain high proportions of vinyl groups, the polymerization is preferably carried out in the absence of hydrogen.

The polymerization is preferably carried out in a single reactor, in particular a gas-phase reactor. The polyethylene of the invention is obtained by use of the catalyst of the invention in the polymerization of ethylene with α-olefins having from 3 to 12 carbon atoms. The polyethylene powder obtained directly from the reactor displays a very high homogeneity, so that, unlike the cascade processes, subsequent extrusion is not necessary in order to obtain a homogeneous product.

The production of polymer blends by intimate mixing of individual components or by melt extrusion in an extruder or kneader (see, for example, "Polymer Blends" in Ullmann's Encyclopedia of Industrial Chemistry, $6^{th}$ Edition, 1998, Electronic Release) is often accompanied by particular difficulties. The melt viscosities of the high molecular weight and low molecular weight components of a bimodal polyethylene blend are very different. While the low molecular weight component is quite fluid at the customary temperatures of about 190-210° C. for producing the blends, the high molecular weight component is only softened ("lentil soup"). Homogeneous mixing of the two components is therefore very difficult. In addition, it is known that the high molecular weight component can easily be damaged by thermal stress and by shear forces in the extruder, so that the properties of the blend deteriorate. The quality of mixing of such polyethylene blends is therefore often unsatisfactory.

The quality of mixing of the polyethylene powder obtained directly from the reactor can be tested by assessing thin disks ("microtome sections") of a sample under an optical microscope. Inhomogeneities show up in the form of specks or "white spots". The specks or "white spots" are predominantly high molecular weight, high-viscosity particles in a low-viscosity matrix (see, for example, U. Burkhardt et al. in " Aufbereiten von Polymeren mit neuartigen Eigenschaften", VDI-Verlag, Düsseldorf 1995, p. 71). Such inclusions can reach a size of up to 300 µm, cause stress cracks and brittle failure of components. The better the quality of mixing of a polymer, the fewer the inclusions present and the smaller these inclusions. The quality of mixing of a polymer is determined quantitatively in accordance with ISO 13949. According to the measurement method, a microtome section is prepared from a sample of the polymer, the number and size of these inclusions are determined and a grade for the quality of mixing of the polymer is given according to a set-down evaluation scheme.

An important application of bimodal polyethylenes is their use for producing pressure pipes for the transport of gas, mains water and wastewater. Pressure pipes made of polyethylene are increasingly replacing metal pipes. A very long useful life of the pipe, without aging and brittle failure having to be feared, is important in such an application. Even small flaws or notches on a pressure pipe can grow even at low pressures and lead to brittle failure, with this process being able to be accelerated by an increase in temperature and/or aggressive chemicals. It is therefore extremely important to reduce the number and size of flaws in a pipe, for example specks or "white spots", as far as at all possible.

The preparation of the polyethylene according to the invention in the reactor itself reduces the energy consumption, requires no subsequent blending processes and allows simple control of the molecular weight distributions and the molecular weight fractions of the various polymers. In addition, good mixing of the polyethylene is achieved.

The following examples illustrate the invention without restricting its scope.

The measured values described were determined in the following way:

IR spectra were measured on 0.1 mm thick PE films produced by pressing at 180° C. for 15 minutes. The number of methyl side chains per 1000 carbon atoms of the polymer chain ($CH_3/1000$) was determined by means of IR in accordance with ASTM D 6248-98.

The density of the polymer samples was determined by means of IR spectroscopy using chemical calibration of IR spectra against density determined by the buoyancy method in accordance with ISO 1183.

The branches/1000 carbon atoms were determined by means of $^{13}$C-NMR, as described by James C. Randall, JMS-REV. Macromol. Chem. Phys., C29 (2&3), 201-317 (1989) and relate to the total $CH_3$ group content/1000 carbon atoms including end groups. The side chains larger than $CH_3/1000$ carbon atoms is likewise determined in this way (excluding end groups).

The degree of branching in the individual polymer fractions is determined by the method of Holtrup (W. Holtrup, Makromol. Chem. 178, 2335 (1977)) coupled with $^{13}$C-NMR.

The determination of the molar mass distributions and the means Mn, Mw and Mw/Mn derived therefrom was carried out by high-temperature gel permeation chromatography using a method described in DIN 55672-1:1995-02 issue February 1995. The deviations according to the mentioned DIN standard are as follows: Solvent 1,2,4-trichlorobenzene (TCB), temperature of apparatus and solutions 135° C. and as concentration detector a PolymerChar (Valencia, Paterna 46980, Spain) IR-4 infrared detector, capable for use with TCB. A WATERS Alliance 2000 equipped with the following precolumn SHODEX UT-G and separation columns SHODEX UT 806 M (3x) and SHODEX UT 807 connected in series was used. The solvent was vacuum destilled under Nitrogen and was stabilized with 0.025% by weight of 2,6-di-tert-butyl-4-methylphenol. The flowrate used was 1 ml/min, the injection was 500 µl and polymer concentration was in the range of 0.01%<conc.<0.05% w/w. The molecular weight calibration was established by using monodisperse polystyrene (PS) standards from Polymer Laboratories (now Varian, Inc., Essex Road, Church Stretton, Shropshire, SY6 6AX, UK) in the range from 580 g/mol up to 11600000 g/mol and additionally Hexadecane. The calibration curve was then adapted to Polyethylene (PE) by means of the Universal Calibration method (Benoit H., Rempp P. and Grubisic Z., & in J. Polymer Sci., Phys. Ed., 5, 753(1967)). The Mark-Houwing parameters used herefore were for PS: $k_{PS}$=0.000121 dl/g, $\alpha_{PS}$=0.706 and for PE $k_{PE}$=0.000406 dl/g, $\alpha_{PE}$=0.725, valid in TCB at 135° C. Data recording, calibration and calculation was carried out using NTGPC_Control_V6.02.03 and NTGPC_V6.4.24 (hs GmbH, Hauptstraβe 36, D-55437 Ober-Hilbersheim) respectively.

Intrinsic viscosity η, which is the value of the viscosity number by extrapolation of polymer concentration to zero, was determined on an automatic Ubbelohde viskometer (Lauda PVS 1) at a concentration of 0.001 g/ml in decaline as a solvent and at a temperature of 135° C. according to EN ISO 1628-1:1998.

For the purposes of the present invention, the expression "HLMI" is, as is known, short for "high load melt flow rate" and this property is always measured at 190° C. under a load of 21.6 kg (190° C./21.6 kg) in accordance with ISO 1133.

Abbreviations in the following table:

| Cat. | catalyst |
| --- | --- |
| Mw | weight average molar mass |
| Mn | number average molar mass |
| Density | polymer density |

Percentages are, unless indicated otherwise, by weight.

EXAMPLE 1

Preparation of 2,6-Diacetylpyridinebis(2-Chloro-6-Methylphenyl)Iron Dichloride 2,6-Diacetylpyridinebis(2-chloro-6-methylphenylanil) was prepared as in Example 2 of WO 98/27124 and reacted in an analogous manner with iron (II) chloride to form 2,6-diacetylpyridinebis(2-chloro-6-methylphenyl)iron dichloride, as likewise disclosed in WO 98/27124.

EXAMPLE 2

Preparation of 2,6-Diacetylpyridinebis(2,4-Dichloro-6-Methylphenylanil)Iron Dichloride 2,6-Diacetylpyridinebis(2,4-dichloro-6-methylphenylanil)iron dichloride was prepared by the method of Qian et al., Organometallics 2003, 22, 4312-4321. Here, 65.6 g of 2,6-diacetylpyridine (0.4 mol), 170 g of 2,4-dichloro-6-methylaniline (0.483 mol), 32 g of silica gel type 135 and 160 g of molecular sieve (4Å) were stirred in 1500 ml of toluene at 80° C. for 5 hours and a further 32 g of silica gel type 135 and 160 g of molecular sieve (4Å) were subsequently added. The mixture was stirred at 80° C. for 8 hours, the insoluble solid was filtered off and washed twice with toluene. The solvent was distilled off from the filtrate obtained in this way, the residue was admixed with 200 ml of methanol and subsequently stirred at 55° C. for 1 hour. The suspension formed in this way was filtered and the solid obtained was washed with methanol and freed of the solvent. This gave 95 g of 2,6-diacetylpyridinebis(2,4-dichloro-6-methylphenyl) in a yield of 47%. The reaction with iron (II) chloride was carried out by the method of Qian et al., Organometallics 2003, 22, 4312-4321.

EXAMPLE 3

Preparation of a Mixed Catalyst System

Application of 2,6-diacetylpyridinebis(2,4-dichloro-6-methylphenylanil)iron dichloride to a Ziegler catalyst (Sylopol 5951 batch No. 8009 from Grace) as support 70.2 g of Sylopol 5951 batch No. 8009 from Grace were placed under argon in a reaction vessel. In parallel, 2908.25 µmol of 2,6-diacetylpyridinebis(2,4-dichloro-6-methylphenylanil)iron dichloride (40 µmol/g of Ziegler catalyst) under argon in a second reaction vessel were admixed with 145.416 mmol of MAO (Fe:Al ratio=1:50). This gave a yellowish-brownish black solution which was stirred at room temperature for 30 minutes.

This solution was subsequently dripped directly onto the Ziegler catalyst in an argon atmosphere over a period of 15 minutes, with the temperature being kept below 25° C. The product was stirred at room temperature for another 2 hours. The solid was dried under reduced pressure until it was free-flowing. This gave 98.5 g of catalyst which still comprised 14.9% of solvent (based on the total weight and calculated on the basis of all components being completely applied to the support) and had a bulk density of 630 g/l.

EXAMPLE 4

Polymerization of The Catalyst from Example 3

The polymerization of ethylene was carried out in a fluidized-bed reactor having a diameter of 0.5 m. The polymerization was carried out at a reaction temperature of 94° C., a reaction pressure of 19.9 bar and an output of 5.2 kg/h. The reactor gas comprised 1.49% by volume of hexane, 44.76% by volume of propane and 9.64% by volume of hydrogen. 1.49% by volume of hexene were used as comonomer. 0.1 g/h of triisobutylaluminum and 0.043 g/h of Costelan were metered in in each case. Costelan AS 100 (from Costenoble, Eschborn, Germany) is an antistatic. The catalysts from Example 3 served as catalyst. The productivity was 5383 g of PE/g of catalyst. The polymer obtained had an intrinsic viscosity of 2.41 dl/g and an HLMI of 17.5 g/10 min.

EXAMPLE 5

Application of 2,6-Diacetylpyridinebis(2,4-Dichloro-6-Methylphenylanil)Iron Dichloride to a Ziegler Catalyst As Support 241.5 g of a Ziegler catalyst comprising 2.4% of Mg, 9.2% of Cl, 2.4% of Ti and 0.09% of Al (the amount corresponds to 236.7 g of dry Ziegler catalyst having a residual moisture content of 2%) were placed under argon in a reaction vessel. In parallel, 7101 μmol of 2,6-diacetylpyridinebis(2,4-dichloro-6-methylphenylanil)iron dichloride (prepared as in Example 1 a2 in EP06026752.3) (30 μmol/g of dry Ziegler catalyst) under argon in a second reaction vessel were admixed with 1349.2 mmol of MAO (Fe:Al ratio=1:190). This gave a brownish black solution which was stirred at room temperature for 15 minutes.

This solution was subsequently dripped directly onto the Ziegler catalyst under an argon atmosphere at a temperature of 0° C. over a period of 15 minutes. After 30 minutes, the solution was warmed to room temperature. The product was stirred at room temperature for another 1 hour. The solid was dried under reduced pressure until it was free-flowing. This gave 416.3 g of catalyst which still comprised 23.3% of solvent (based on the total weight and calculated on the basis of all components being completely applied to the support) and had a bulk density of 546 g/l.

EXAMPLES 6 AND 7

Polymerization 400 ml of isobutane, the amount of 1-hexene indicated in Table 2 as comonomer and 60 mg of triisobutylaluminum were introduced into a 1 l autoclave which had been made inert by means of argon and the catalyst solid obtained in Example 5 was finally added. Polymerization was carried out for 60 minutes at an ethylene pressure of 40 bar and 90° C. The polymerization was stopped by releasing the pressure. In the case of Example 6, 153 mg of catalyst solid were added and 137 g of polyethylene were obtained, so that the productivity was 895 g/g of catalyst. In the case of Example 7, 189 mg of catalyst solid were added and 47 g of polyethylene were obtained, so that the productivity was 248.7 g/g of catalyst.

EXAMPLE 8

Application of 2,6-Diacetylpyridinebis(2,4-Dichloro-6-Methylphenylanil)Iron Dichloride to a Ziegler Catalyst As Support 108.1 g of a Ziegler catalyst (from Example 1 of WO 2004/92232) comprising 2.4% of Mg, 9.2% of Cl, 2.4% of Ti and 0.09% of Al (the amount corresponds to 105.9 g of dry Ziegler catalyst having a residual moisture content of 2%) were placed under argon in a reaction vessel. In parallel, 3170 μmol of 2,6-diacetylpyridinebis(2,4-dichloro-6-methylphenylanil)iron dichloride (30 μmol/g of dry Ziegler catalyst) under argon in a second reaction vessel were admixed with 444.78 mmol of MAO (Fe:Al ratio=1:140). This gave a brownish black solution which was stirred at room temperature for 15 minutes.

This solution was subsequently dripped directly onto the Ziegler catalyst under an argon atmosphere at a temperature of 0° C. over a period of 15 minutes. After 30 minutes, the solution was warmed to room temperature. The product was stirred at room temperature for another 1 hour. This gave 198.2 g of catalyst which still comprised 32.6% of solvent (based on the total weight and calculated on the basis of all components being completely applied to the support) and had a bulk density of 537 g/l.

EXAMPLE 9

Polymerization of The Catalysts from Example 8

The polymerization was carried out at a reaction temperature of 105° C., a reaction pressure of 19.9 bar and an output of 5.3 kg/h. The reactor gas comprised 4.99% by volume of hexane, 0.17% by volume of ethene and 0.35% by volume of hydrogen. 1.3% by volume of hexene were used as comonomer. 0.1 g/h of triisobutylaluminum and 0.031 g/h of Costelan were metered in in each case. The catalyst of Example 8 served as catalyst. The properties of the polymers obtained are summarized below in Table 1. The productivity was 1108 g of PE/g of catalyst.

EXAMPLE 10

Application of 2,6-Diacetylpyridinebis(2,4-Dichloro-6-Methylphenylanil)Iron Dichloride to a Ziegler Catalyst As Support 168.8 g of a Ziegler catalyst (from Example 1 of WO 2004/92232) comprising 2.4% of Mg, 9.2% of Cl, 2.4% of Ti and 0.09% of Al (the amount corresponds to 165.4 g of dry Ziegler catalyst having a residual moisture content of 2%) were placed under argon in a reaction vessel. In parallel, 4960 μmol of 2,6-diacetylpyridinebis(2,4-dichloro-6-methylphenylanil)-iron dichloride (30 μmol/g of dry Ziegler catalyst) under argon in a second reaction vessel were admixed with 942.78 mmol of MAO (Fe:Al ratio=1:190). This gave a brownish black solution which was stirred at room temperature for 15 minutes.

This solution was subsequently dripped directly onto the Ziegler catalyst under an argon atmosphere at a temperature of 0° C. over a period of 15 minutes. After 30 minutes, the solution was warmed to room temperature. The product was stirred at room temperature for another 1 hour. The solid was dried under reduced pressure for 30 minutes. This gave 329 g of catalyst which still comprised 32.2% of solvent (based on the total weight and calculated on the basis of all components being completely applied to the support).

EXAMPLE 11

Polymerization of The Catalysts rrom Example 10

The polymerization was carried out in a fluidized-bed reactor as described in Example 4.

The polymerization was carried out at a reaction temperature of 104.9° C., a reaction pressure of 20.0 bar and an output of 5.3 kg/h. The reactor gas comprised 5% by volume of hexane and 0.72% by volume of hydrogen. 2.01% by volume of hexene were used as comonomer. 0.1 g/h of triisobutylaluminum and 0.043 g/h of Costelan were metered in in each case. The catalysts of Example 10 served as catalyst. The properties of the polymers obtained are summarized below in Table 1. The productivity was 1323 g of PE/g of catalyst.

COMPARATIVE EXAMPLE 1

Step 1: Ziegler Component 103.8 g of XP02107 (a spray-dried silica gel from Grace which has been baked at 800° C. in a nitrogen atmosphere for 5 hours) are cooled and mixed with 520 ml of heptane under argon to form a suspension. The suspension was heated to 54° C. After the temperature had been reached, 85.4 mmol of n-Bu$_2$Mg were introduced over a period of 20 minutes and the mixture was subsequently stirred for a further 30 minutes. This was followed by, in the order indicated, addition of 76.8 mmol of n-butanol over a period of 15 minutes, stirring for another 30 minutes and addition of 44.8 mmol of Ti (as TiCl$_2$-heptane solution) over a period of 15 minutes. A rapid color change from reddish white to dark brown occurred. The suspension was stirred at 54° C. for a further 30 minutes and subsequently cooled to room temperature again.

Step 2: Loading with Metallocene and MAO

In parallel, 7.02 mmol of bis(n-butylcyclopentadienyl)zirconium dichloride under argon in a second reaction vessel were admixed with 711.1 mmol of MAO (Zr:Al ratio=1:101). This solution was subsequently dripped directly onto the Ziegler catalyst under an argon atmosphere over a period of 60 minutes. The solution was stirred at room temperature for another 60 minutes. The solid was dried under reduced pressure firstly at room temperature and then at 50° C. until the weight was constant. This gave 172.6 g of dark brown catalyst which still comprised 0-1% of solvent and had a bulk density of 424 g/l. The ratio of Ti:Zr is 6.38:1.

COMPARATIVE EXAMPLES 2 AND 3

Polymerization of The Catalysts from Comparative Example 1

80 g of PE powder as initial charge having a particle size of >1 mm (baked at 80° C. under reduced pressure for 6 hours and stored under argon) were placed in a 1 l autoclave which had been made inert by means of argon at 70° C. 150 mg of isoprenylaluminum and 50 mg of Costelan AS 100 were then added. The catalyst solid obtained in comparative example 1 was subsequently added. Polymerization was carried out for 60 minutes at an ethylene pressure of 20 bar and 70° C. The polymerization was stopped by releasing the pressure. In the case of comparative example 2, 120 mg of catalyst were added and the yield was 129 g of PE, so that the productivity of the catalyst was 1075 g of PE/g of catalyst. In the case of comparative example 3, 107 mg of catalyst were added and the yield was 9 g of PE, so that the productivity of the catalyst was 84 g of PE/g of catalyst. The amount of polyethylene obtained and the productivitiy are shown in Table 2.

EXAMPLE 12

Step 1: Ziegler Component 220 g of ES70X (a spray-dried silica gel from Ineos, which has been baked at 800° C. in a nitrogen atmosphere for 5 hours) were cooled and mixed with 1300 ml of heptane (Aldrich, water-free) under argon to form a suspension. The suspension was heated to 50° C. After the temperature had been reached, 330 mmol of n-Bu$_2$Mg were introduced over a period of 3 minutes and the mixture was subsequently stirred for a further 30 minutes. The solution was washed 3 times with 1000 ml of heptane. The suspension was cooled to room temperature and 330 mmol of dibutylmagnesium were added dropwise over a period of 10 minutes. This resulted in a temperature increase to 30° C., and the suspension was stirred at 50° C. for a further 60 minutes and subsequently cooled to room temperature. 660 mmol of tert-butyl chloride were subsequently introduced over a period of 5 minutes, resulting in the suspension warming to 56° C. The suspension was stirred at 50° C. for another 60 minutes.

In parallel, 33 mmol of TiCl$_4$ were placed under argon in a second reaction vessel and admixed with 15 ml of heptane. 33 mmol of titanium n-pyrolate in 15 ml of heptane were added dropwise to this solution over a period of 10 minutes. A yellowish brown solution is formed and this was stirred for another 30 minutes. This solution was added to the above suspension over a period of 1 minute. The resulting suspension was heated to 50° C. and stirred at this temperature for 2 hours. It became black after 30 minutes.

The suspension was filtered through a glass frit and washed 3 times with 1000 ml each time of heptane. The solid was dried at room temperature under reduced pressure. This gave 305.2 g of light-brown powder comprising 0.86% of Ti and 2.7% of Mg. The Ti loading was 0.3 mmol/g of SiO$_2$.

Step 2: Loading with MAO 154.4 g of the Ziegler component prepared above were suspended in 750 ml of toluene under argon. 807.3 mmol of MAO were added to the suspension over a period of 5 minutes, resulting in the temperature increasing to 2° C. The solution was stirred at room temperature for another 60 minutes, subsequently filtered through a glass frit and washed twice with 600 ml of toluene. The solid was subsequently dried to constant weight under reduced pressure. This gave 267 g of a light-brown powder which still contained about 24% of solvent. The analytical results were: Ti=0.61%, Mg=1.9% and Al=5.3%

Step 3: Loading with Iron 124.5 g of the MAO-laden Ziegler component prepared above were suspended in 600 ml of toluene. 2.16 mmol of 2,6-diacetylpyridinebis(2,4-dichloro-6-methylphenylanil) iron dichloride are added to this suspension and the suspension is stirred for 1 hour. The solid was dried under reduced pressure until it was free-flowing. This gave 93.5 g of a brown powder which comprised no solvent and had a bulk density of 320 g/l.

The analytical results are: Ti=0.78%, Mg=2.4%, Al=6.2% and Fe=0.08%. (This corresponds to a loading of 18.6 μmol/g of Ziegler)

EXAMPLE 13

Polymerization of The Catalyst from Example 12

The polymerization was carried out in a fluidized-bed reactor as described in Example 4. The experimental conditions are shown in Table 6. The properties of the polymers obtained are summarized below in Table 9.

The polymerization was carried out at a reaction temperature of 93.9° C., a reaction pressure of 20.0 bar and an output of 4.5 kg/h. The reactor gas comprised 2% by volume of hexane, 39.51% by volume of propane and 3.42% by volume of hydrogen. 1.93% by volume of hexene were used as comonomer. 0.1 g/h of triisobutylaluminum and 0.026 g/h of Costelan were metered in in each case. Catalysts as described in Example 12 served as catalyst. The properties of the polymers obtained are summarized below in Table 1. The productivity was 2473 g of PE/g of catalyst.

COMPARATIVE EXAMPLE 4

Step 1: Loading of XPO 2107 With MAO 215.7 g of XPO 2107 (from Grace, which has been calcined at 600° C. in a nitrogen atmosphere for 6 hours) were mixed with 1000 ml of toluene under argon to form a suspension. The suspension was cooled to 0° C. After the temperature had been reached, 647 mmol of MAO were added. The suspension was subsequently heated to 80° C. and stirred for another one hour. The suspension was then washed with 1000 ml of toluene and dried under reduced pressure for 10 hours. This gave 287.3 g of white powder.

Step 2: Loading with Fe Complex and MAO 110 g of the support material obtained in step 1 were then placed in a reaction vessel and suspended in 700 ml of toluene. In a second flask, 2477.6 μmol of 2,6-diacetylpyridinebis(2,4,6-trimethylphenylanil)iron dichloride (prepared as in Example 1 a1 in EP06026752.3) were suspened in 272.55 mmol of MAO and the suspension was stirred for another one hour. This suspension was added to the suspended support material and the mixture was stirred for another two hours. The catalyst is then washed 3 times with a total of 600 ml of toluene and dried under reduced pressure for 10 hours. This gave 116.9 g of light-brown powder.

COMPARATIVE EXAMPLE 5

Polymerization of The Catalyst from Comparative Example 4

The polymerization was carried out in a fluidized-bed reactor as described in Example 4. The experimental conditions are shown in Table 7. The properties of the polymers obtained are summarized below in Table 9.

The polymerization was carried out at a reaction temperature of 93.9° C., a reaction pressure of 20.0 bar and an output of 3.5 kg/h. The reactor gas comprised 0.76% by volume of hexane and 1.01% by volume of hydrogen. 0.76% by volume of hexene was used as comonomer. 0.1 g/h of triisobutylaluminum and 0.021 g/h of Costelan were metered in in each case. The catalysts of comparative example 4 served as catalyst. The properties of the polymers obtained are summarized below in Table 1. The productivity was 2171 g of PE/g of catalyst.

COMPARATIVE EXAMPLE 6

Application of 2,6-Diacetylpyridinebis(2,4-Dichloro-6-Methylphenylanil)Iron Dichloride to a Support 39.6 g of XPO2107 (which has been calcined at 600° C. in a nitrogen atmosphere for 6 hours) were placed in a reaction vessel. 791 μmol of 2,6-diacetylpyridinebis(2,4-dichloro-6-methylphenylanil)iron dichloride are placed in a second flask and suspended in 78.9 mmol of MAO. This solution was diluted with 35 ml of toluene and dissolved for 40 minutes. This solution was slowly added dropwise to the support material while stirring. This powder was stirred for another 1.5 hours stirred for further 30 minutes. This gave 80 g of catalyst having a residual moisture content of 30.5%.

COMPARATIVE EXAMPLE 7

Polymerization of The Catalysts from Comparative Example 6

100 g of PE powder having a particle size of >1 mm (baked at 80° C. under reduced pressure for 6 hours and stored under argon) were placed as initial charge in a 1 l autoclave which had been made inert by means of argon at 70° C. 150 mg of isoprenylaluminum and 50 mg of Costelan AS 100 were then added. 176 mg of the catalyst solid obtained in comparative example 6 were subsequently added. Polymerization was carried out for 60 minutes at an ethylene pressure of 20 bar and 70° C. The polymerization was stopped by releasing the pressure. The amount of polyethylene obtained was 69 g and the productivity of the catalyst was 392 g of PE/392 g of catalyst.

TABLE 1

| Example | η [dl/g] | Mw [g/mol] | Mw/Mn = Q | CH$_3$ 1/1000 C. | Vinyl 1/1000 C. | Hexene [%] | Bulk density [g/l] | Density [g/cm$^3$] ISO | Density [g/cm$^3$] IR | HLMI [g/10 min] |
|---|---|---|---|---|---|---|---|---|---|---|
| 6 | 3.52 | | | — | 1.92 | | | | 0.9571 | |
| 7 | 4.05 | | | 2.9 | 2.13 | 2.9 | | | 0.9472 | |
| 9 | 2.84 | 289444 | 40.3 | 4.6 | 2.3 | 0.8 | 415 | 0.9523 | | 17.9 |
| 11 | 2.59 | 241057 | 29.28 | 5 | 2.26 | 1.5 | 418 | 0.95 | | 18.9 |
| 13 | 2.69 | 232185 | 13.16 | 4.5 | 1.08 | 1.7 | 426 | 0.945 | | 15.2 |
| C2 | 11.83 | 987075 | 33.3 | 0.8 | 0.1 | | | | 0.9438 | |
| C3 | 9.01 | 1007486 | 49.5 | 1.7 | 0.1 | | | | 0.9382 | |
| C5 | 3.3 | 330090 | 16.18 | <1 | 0.6 | | | 0.954 | | 6.2 |
| C7 | 0.97 | 51148 | 6.85 | 4.6 | 2.38 | 0 | | | 0.970 | |

TABLE 2

| Example | Fraction | Intrinsic visc. (eta value) [dl/g] | Proportions [%] | IR trans double bond [1/1000 C.] | IR vinyl double bond [1/1000 C.] | IR vinylidene double bond | IR total CH$_3$ [1/1000 C.] | IR Hexenes [%] |
|---|---|---|---|---|---|---|---|---|
| 13 | 8 | 5.85 | 19.52 | 0.01 | 0.06 | 0.14 | 2.2 | 1.3 |
| 13 | 7 | 1.59 | 24.98 | <0.01 | 0.13 | 0.19 | 3.2 | 1.7 |
| 13 | 6 | 2.76 | 19.82 | <0.01 | 0.25 | 0.18 | 4.5 | 2.1 |
| 13 | 5 | 0.8 | 21.38 | <0.01 | 0.54 | 0.16 | 5.9 | 2 |
| 13 | 4 | 0.47 | 1.82 | 0.04 | 1.21 | 0.23 | 5.4 | 1.2 |
| 13 | 3 | 0.26 | 1.78 | 0.06 | 2.21 | 0.28 | 6.2 | 0 |
| 13 | 2 | 0.2 | 2.59 | 0.12 | 3.87 | 0.17 | 8.7 | 0 |
| 13 | 1 | 0.11 | 3.52 | 0.14 | 4.45 | 0.78 | 8.6 | 0 |

The invention claimed is:

1. A catalyst system comprising
   A) at least one polymerization catalyst based on a Ziegler catalyst,
   B) at least one polymerization catalyst based on a late transition metal component having a tridentate ligand which bears at least two ortho,ortho-disubstituted aryl radicals, with the ortho,ortho-disubstituted aryl radicals being substituted in each case by at least one halogen in the α position,
   C) one or more activating compounds and
   D) optionally one or more organic or inorganic supports.

2. The catalyst system according to claim 1, wherein the late transition metal component is a compound of the formula (II)

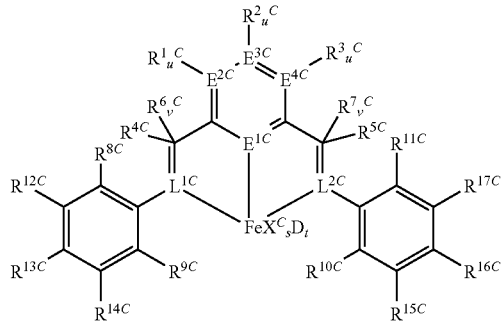

where the variables have the following meanings:
   $E^{1C}$ is nitrogen or phosphorus,
   $E^{2C}$-$E^{4C}$ are each, independently of one another, carbon, nitrogen or phosphorus,
   $R^{1C}$-$R^{3C}$ are each independently of one another, hydrogen, $C_1$-$C_{22}$-alkyl, $C_2$-$C_{22}$-alkenyl, $C_6$-$C_{22}$-aryl, alkylaryl having from 1 to 10 carbon atoms in the alkyl radical and 6-20 carbon atoms in the aryl radical, halogen, $NR^{18C}_2$, $OR^{18C}$, $SiR^{19C}_3$, where the organic radicals $R^{1C}$-$R^{3C}$ may also be substituted by halogens and/or two vicinal radicals $R^{1C}$-$R^{3C}$ may also be joined to form a five-, six- or seven-membered ring and/or two vicinal radicals $R^{1C}$-$R^{3C}$ may be joined to form a five-, six- or seven-membered heterocycle comprising at least one atom from the group consisting of N, P, O and S,
   $R^{4C}$-$R^{7C}$ are each independently of one another, hydrogen, $C_1$-$C_{22}$-alkyl, $C_2$-$C_{22}$-alkenyl, $C_6$-$C_{22}$-aryl, alkylaryl having from 1 to 10 carbon atoms in the alkyl radical and 6-20 carbon atoms in the aryl radical, $NR^{18C}_2$, $SiR^{19C}_3$, where the organic radicals $R^{4C}$-$R^{7C}$ may also be substituted by halogens and/or two geminal or vicinal radicals $R^{4C}$-$R^{7C}$ may also be joined to form a five-, six- or seven-membered ring and/or two geminal or vicinal radicals $R^{4C}$-$R^{9C}$ may be joined to form a five-, six- or seven-membered heterocycle comprising at least one atom from the group consisting of N, P, O and S and, when v is 0, $R^{6C}$ is a bond to $L^{1C}$ and/or $R^{7C}$ is a bond to $L^{2C}$ so that $L^{1C}$ forms a double bond to the carbon atom bearing $R^{4C}$ and/or $L^{2C}$ forms a double bond to the carbon atom bearing $R^{5C}$,
   u is 0 when $E^{2C}$-$E^{4C}$ is nitrogen or phosphorus and is 1 when $E^{2C}$-$E^{4C}$ is carbon,
   $L^{1C}$-$L^{2C}$ are each, independently of one another, nitrogen or phosphorus,
   $R^{8C}$-$R^{11C}$ are each, independently of one another, $C_1$-$C_{22}$-alkyl, $C_2$-$C_{22}$-alkenyl, $C_6$-$C_{22}$-aryl, alkylaryl having from 1 to 10 carbon atoms in the alkyl radical and 6-20 carbon atoms in the aryl radical or a halogen,
   $R^{12C}$-$R^{17C}$ are each, indepenently of one another, hydrogen, $C_1$-$C_{22}$-alkyl, $C_2$-$C_{22}$-alkenyl, $C_6$-$C_{22}$-aryl, alkylaryl having from 1 to 10 carbon atoms in the alkyl radical and 6-20 carbon atoms in the aryl radical, halogen, $NR^{18C}_2$, $OR^{18C}$, $SiR^{19C}_3$, where the organic radicals $R^{12C}$-$R^{17C}$ may also be substituted by halogens and/or two vicinal radicals $R^{12C}$-$R^{17C}$ may also be joined to form a five-, six- or seven-membered ring and/or two vicinal radicals $R^{12C}$-$R^{17C}$ are joined to form a five-, six- or seven-membered heterocycle comprising at least one atom from the group consisting of N, P, O and S,
   v is independently 0 or 1,
   the radicals $X^C$ are each, independently of one another, fluorine, chlorine, bromine, iodine, hydrogen, $C_1$-$C_{10}$-alkyl, $C_2$-$C_{10}$-alkenyl, $C_6$-$C_{20}$-aryl, alkylaryl having from 1-10 carbon atoms in the alkyl radical and 6-20 carbon atoms in the aryl radical, $NR^{18C}_2$, $OR^{18C}$, $SR^{18C}$, $SO_3R^{18C}$, $OC(O)R^{18C}$, CN, SCN, β-diketonate, CO, $BF_4^-$, $PF_6^-$ or bulky noncoordinating anions and the radicals $X^C$ may optionally be joined to one another,
   the radicals $R^{18C}$ are each, independently of one another, hydrogen, $C_1$-$C_{20}$-alkyl, $C_2$-$C_{20}$-alkenyl, $C_6$-$C_{20}$-aryl, alkylaryl having from 1 to 10 carbon atoms in the alkyl radical and 6-20 carbon atoms in the aryl radical, $SiR^{19C}_3$, where the organic radicals $R^{18C}$ may also be substituted by halogens or nitrogen- and oxygen-comprising groups and two radicals $R^{18C}$ may also be joined to form a five- or six-membered ring,
   the radicals $R^{19C}$ are each, independently of one another, hydrogen, $C_1$-$C_{20}$-alkyl, $C_2$-$C_{20}$-alkenyl, $C_6$-$C_{20}$-aryl, alkylaryl having from 1 to 10 carbon atoms in the alkyl radical and 6-20 carbon atoms in the aryl radical, where the organic radicals $R^{19C}$ may also be substituted by halogens or nitrogen- and oxygen-comprising groups and two radicals $R^{19C}$ may also be joined to form a five- or six-membered ring,
   s is 1, 2, 3 or 4,
   D is an uncharged donor, and
   t is from 0 to 4.

3. The catalyst system according to claim 2, wherein $R^{13C}$ and $R^{16C}$ are each, independently of one another, hydrogen, $C_1$-$C_{22}$-alkyl or halogen.

4. The catalyst system according to claim 1 which comprises a Ziegler component which is immobilized on a support and has been treated with the late transition metal component and the activating compound.

5. A process for preparing polyethylene wherein ethylene is polymerized with α-olefins in the presence of a catalyst system according to claim 1.

6. The process according to claim 5, wherein a monomer mixture of ethylene and/or $C_3$-$C_{12}$-1-alkenes which comprises at least 50 mol % of ethylene is used as monomers in the polymerization.

* * * * *